United States Patent
Yamamoto et al.

(10) Patent No.: US 8,201,104 B2
(45) Date of Patent: *Jun. 12, 2012

(54) CONTENT PLAYER AND METHOD OF DISPLAYING ON-SCREEN MENU

(75) Inventors: Ryuji Yamamoto, Tokyo (JP); Tyler Daniel, Tokyo (JP); Shigeru Enomoto, Kanagawa (JP); Akio Ohba, Kanagawa (JP); Shuji Hiramatsu, Tokyo (JP); Shunsuke Kunieda, Tokyo (JP)

(73) Assignees: Sony Computer Entertainment Inc., Tokyo (JP); Sony Corporation, Tokyo (JP)

( * ) Notice: Subject to any disclaimer, the term of this patent is extended or adjusted under 35 U.S.C. 154(b) by 787 days.

This patent is subject to a terminal disclaimer.

(21) Appl. No.: 11/629,734

(22) PCT Filed: Jun. 2, 2005

(86) PCT No.: PCT/JP2005/010123
§ 371 (c)(1),
(2), (4) Date: Jun. 8, 2007

(87) PCT Pub. No.: WO2005/124519
PCT Pub. Date: Dec. 29, 2005

(65) Prior Publication Data
US 2007/0266411 A1 Nov. 15, 2007

(30) Foreign Application Priority Data
Jun. 18, 2004 (JP) ................................ 2004-181724

(51) Int. Cl.
*G06F 3/48* (2006.01)
(52) U.S. Cl. .... 715/835; 715/810; 715/854; 348/E5.105
(58) Field of Classification Search .................. 715/810, 715/835, 854; 348/E5.105
See application file for complete search history.

(56) References Cited

U.S. PATENT DOCUMENTS
6,119,186 A * 9/2000 Watts et al. ................... 710/104
(Continued)

FOREIGN PATENT DOCUMENTS
JP 8-263255 A 10/1996
(Continued)

OTHER PUBLICATIONS
International Search Report from the corresponding PCT/JP2005/010123 English translation attached.
(Continued)

*Primary Examiner* — Boris Pesin
*Assistant Examiner* — Ece Hur
(74) *Attorney, Agent, or Firm* — Katten Muchin Rosenman LLP

(57) ABSTRACT

Favorable visual appearance and ease of operation are required in the user interface of digital home appliances using a television screen. An array of function icons including multiple function icons representing respective types of media that can be played and an array of content icons including multiple content icons representing items of contents that can be played are displayed practically at the center of an on-screen menu such that the arrays intersect. A moving image icon, which is a function icon displayed in an area of intersection in which the array of function icons and the array of content icons intersect, is highlighted by a color different from that of the other function icons and by an enlarged view. In the array of content icons, the hierarchy of the contents is visually represented.

10 Claims, 20 Drawing Sheets

U.S. PATENT DOCUMENTS

| | | | |
|---|---|---|---|
| 6,236,966 B1 * | 5/2001 | Fleming | 704/259 |
| 6,456,997 B1 * | 9/2002 | Shukla | 1/1 |
| 6,581,068 B1 * | 6/2003 | Bensoussan et al. | 1/1 |
| 6,859,217 B2 * | 2/2005 | Robertson et al. | 715/853 |
| 6,917,911 B2 * | 7/2005 | Schultz | 704/206 |
| 6,941,303 B2 * | 9/2005 | Perrizo | 1/1 |
| 6,976,228 B2 * | 12/2005 | Bernhardson | 715/830 |
| 6,999,918 B2 * | 2/2006 | Ma et al. | 704/10 |
| 7,055,104 B1 * | 5/2006 | Billmaier et al. | 715/765 |
| 7,328,215 B2 * | 2/2008 | Stumpf | 707/797 |
| 7,647,356 B2 * | 1/2010 | Gupta | 707/999.2 |
| 7,664,634 B2 * | 2/2010 | Schultz | 704/207 |
| 7,681,128 B2 * | 3/2010 | Yamamoto et al. | 715/717 |
| 7,809,748 B2 * | 10/2010 | Dong et al. | 707/781 |
| 2002/0154177 A1 * | 10/2002 | Barksdale et al. | 345/853 |
| 2003/0208488 A1 * | 11/2003 | Perrizo | 707/6 |
| 2004/0233239 A1 * | 11/2004 | Lahdesmaki | 345/810 |
| 2005/0262108 A1 * | 11/2005 | Gupta | 707/100 |
| 2007/0198949 A1 * | 8/2007 | Rummel | 715/810 |
| 2008/0059913 A1 * | 3/2008 | Burtner et al. | 715/854 |
| 2008/0071136 A1 * | 3/2008 | Oohashi et al. | 600/27 |
| 2009/0013254 A1 * | 1/2009 | Walker et al. | 715/727 |

FOREIGN PATENT DOCUMENTS

| | | |
|---|---|---|
| JP | 2003-044192 A | 2/2003 |
| JP | 2003-84965 A | 3/2003 |

OTHER PUBLICATIONS

International Preliminary Examination Report on Patentability from the corresponding PCT/JP2005/010123 English translation attached.

Office Action dated Aug. 8, 2006 for the corresponding Japanese Patent Application 2004-181724. English translation attached.

Office Action dated Jul. 26, 2005 for the corresponding Japanese Patent Application 2004-181724. English translation attached.

Sony Corp., "PSX DESR-7000/DESR-5000 Hard Disk Tosai DVD Recorder Toriatsukai Setsumeisho", 2003, p. 56 English translation attached.

Hirohiko Aji, "Kao ka Yameyo ka Kon'ya mo Nayamu PSX Rokugaki to shiteno Jitsuryoku", Nikkei Personal Computing, No. 449, Jan. 19, 2004, pp. 108 to 115 English translation attached.

Korean Office Action mailed Jul. 11, 2008, from the corresponding Korean Application.

* cited by examiner

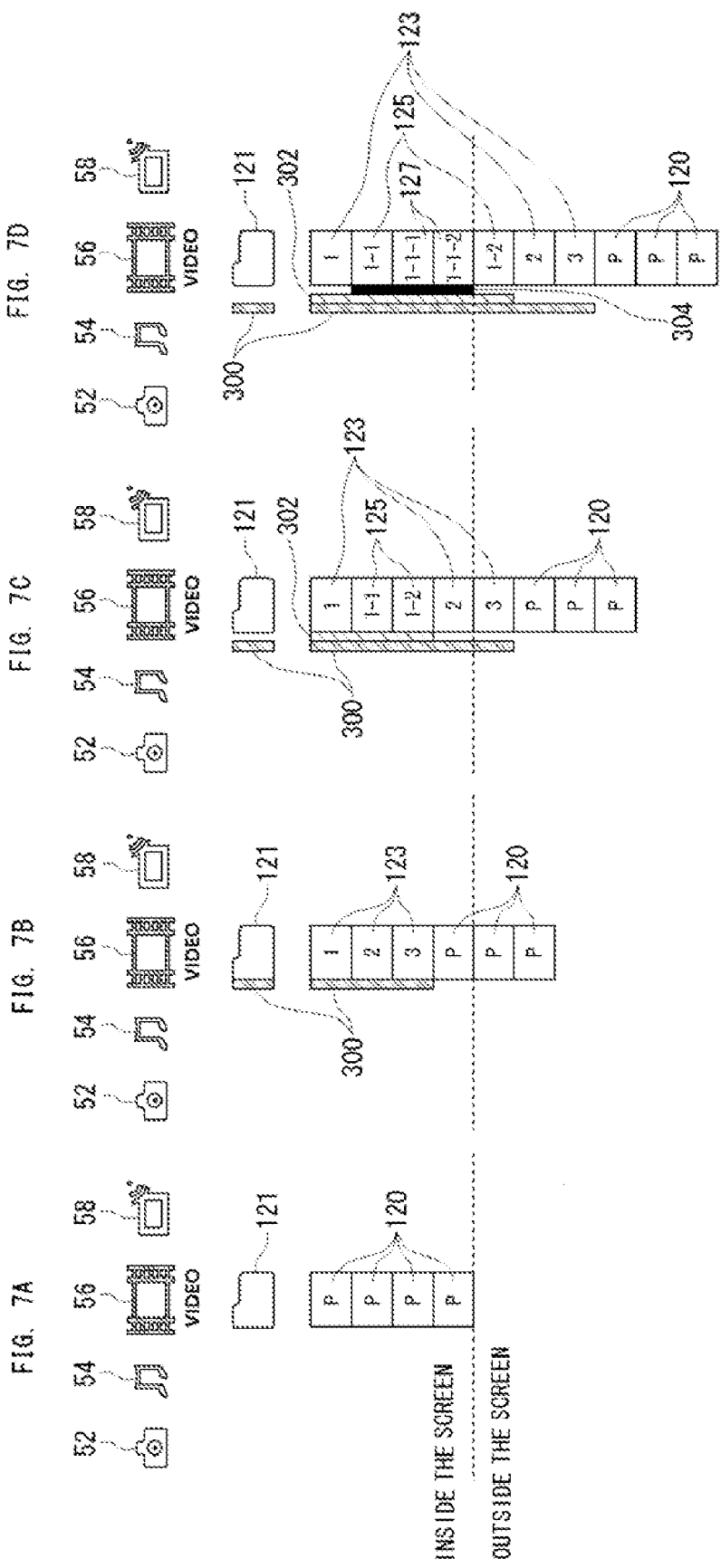

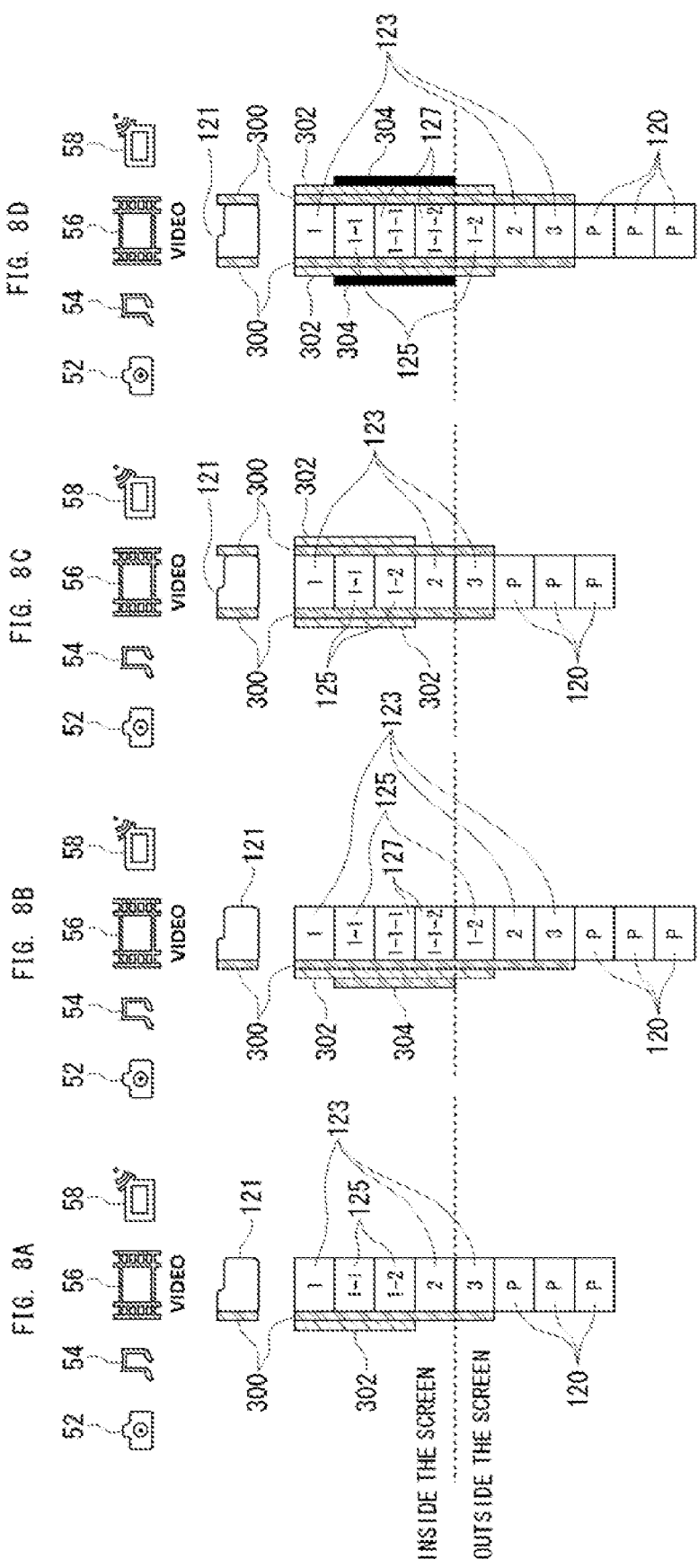

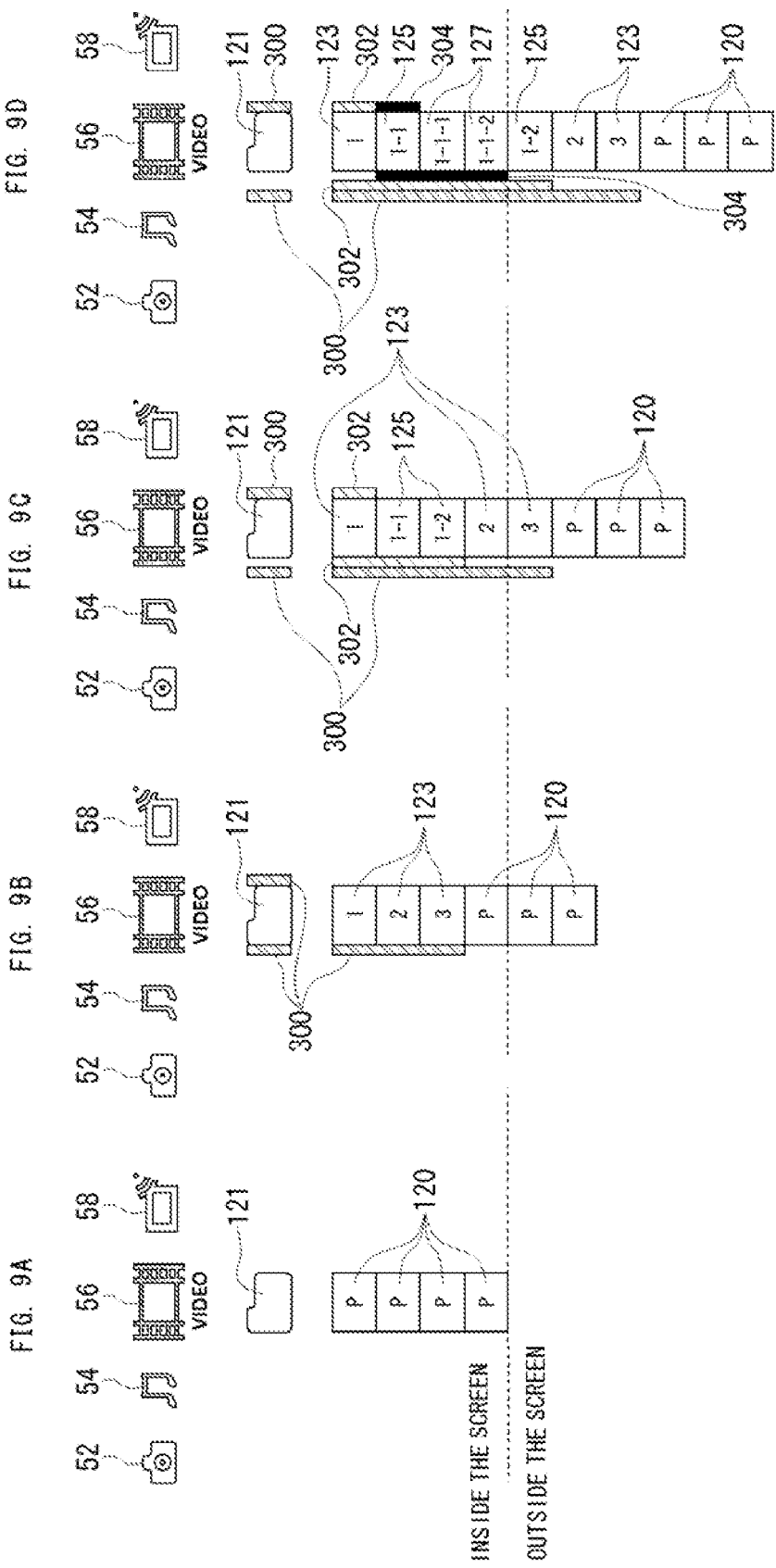

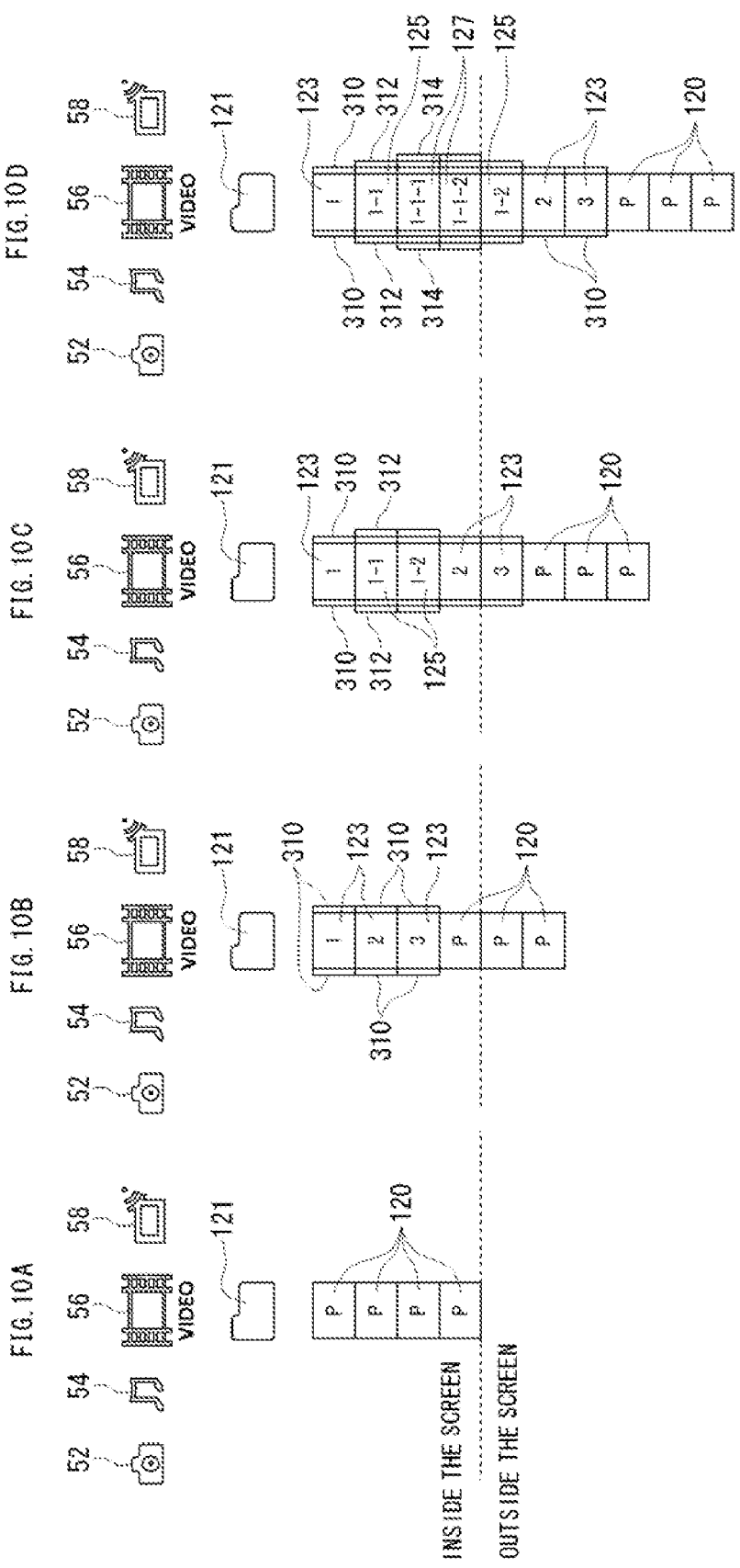

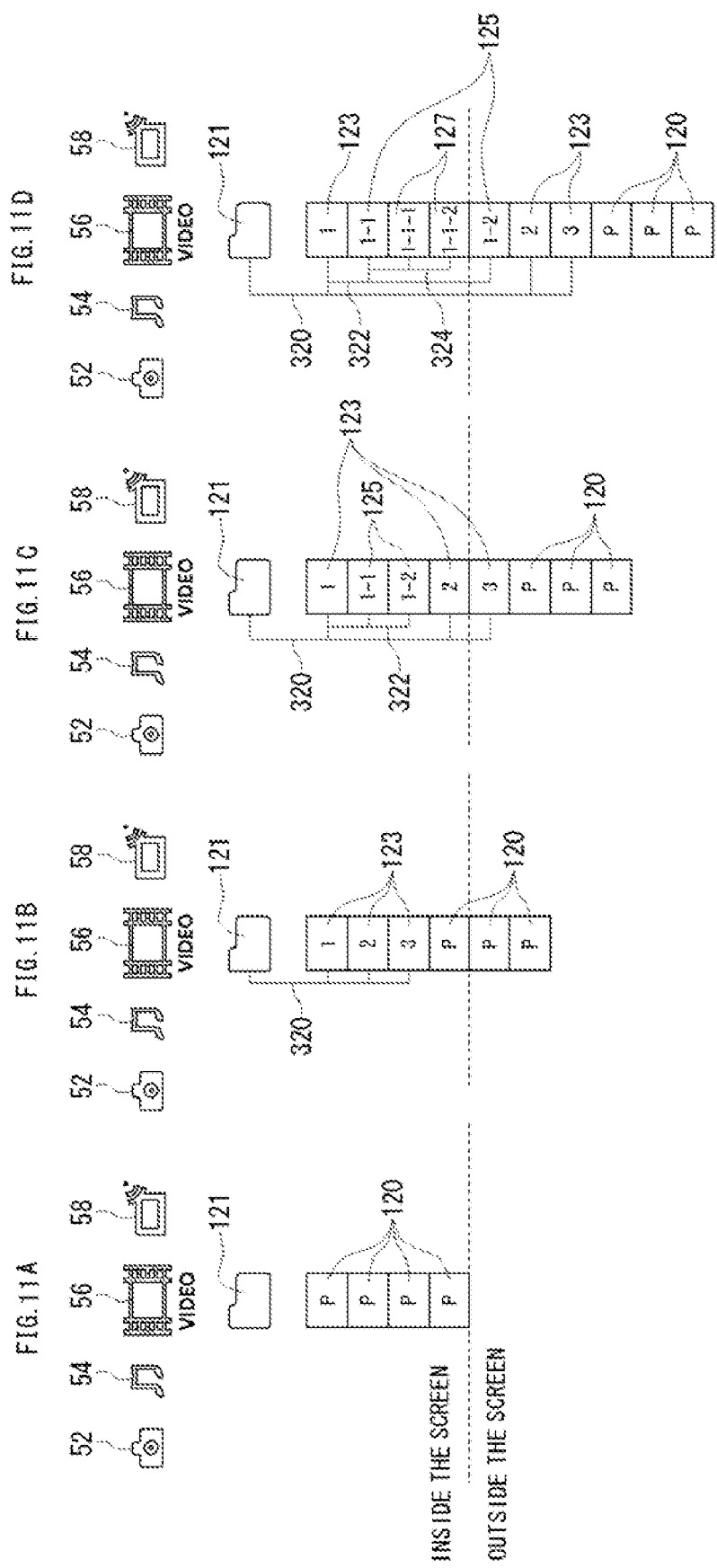

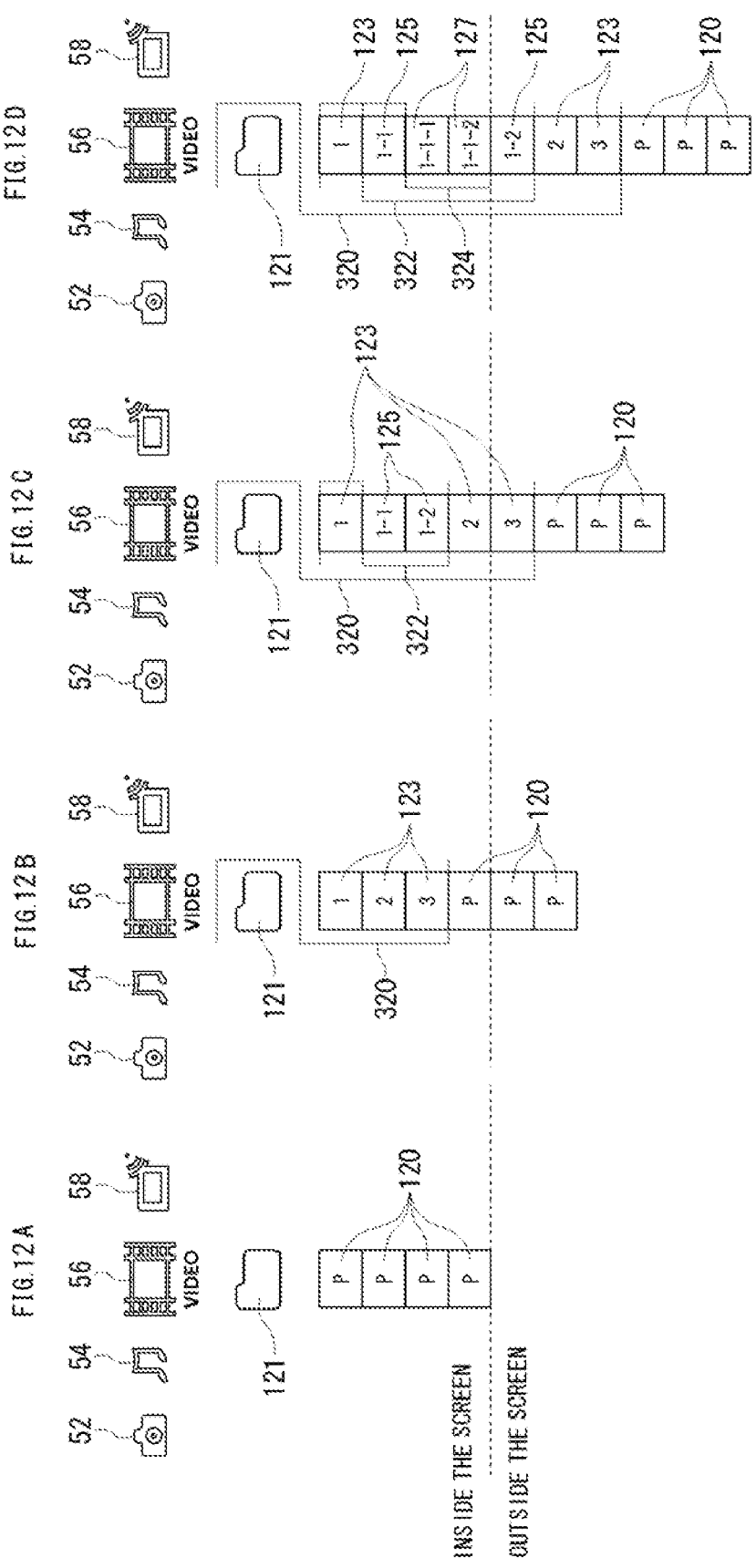

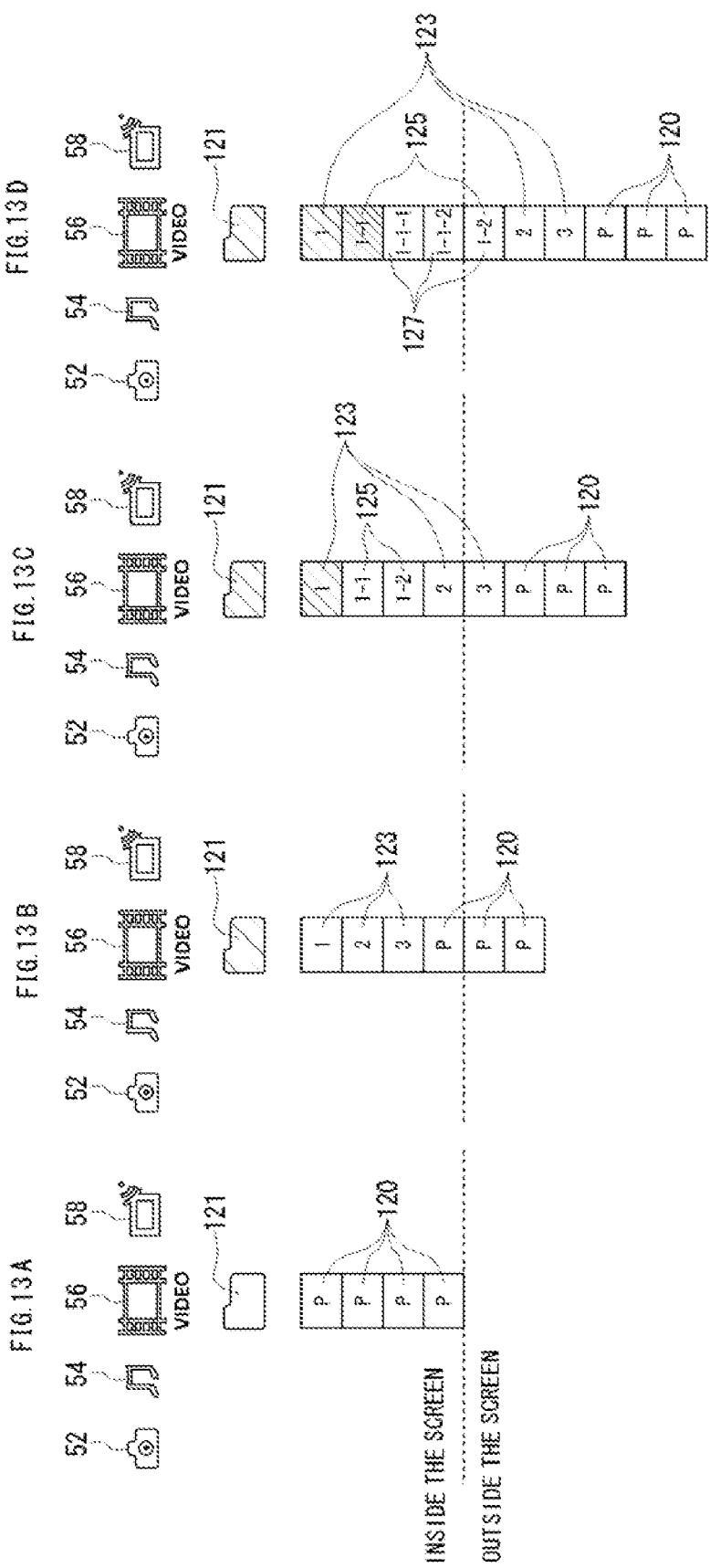

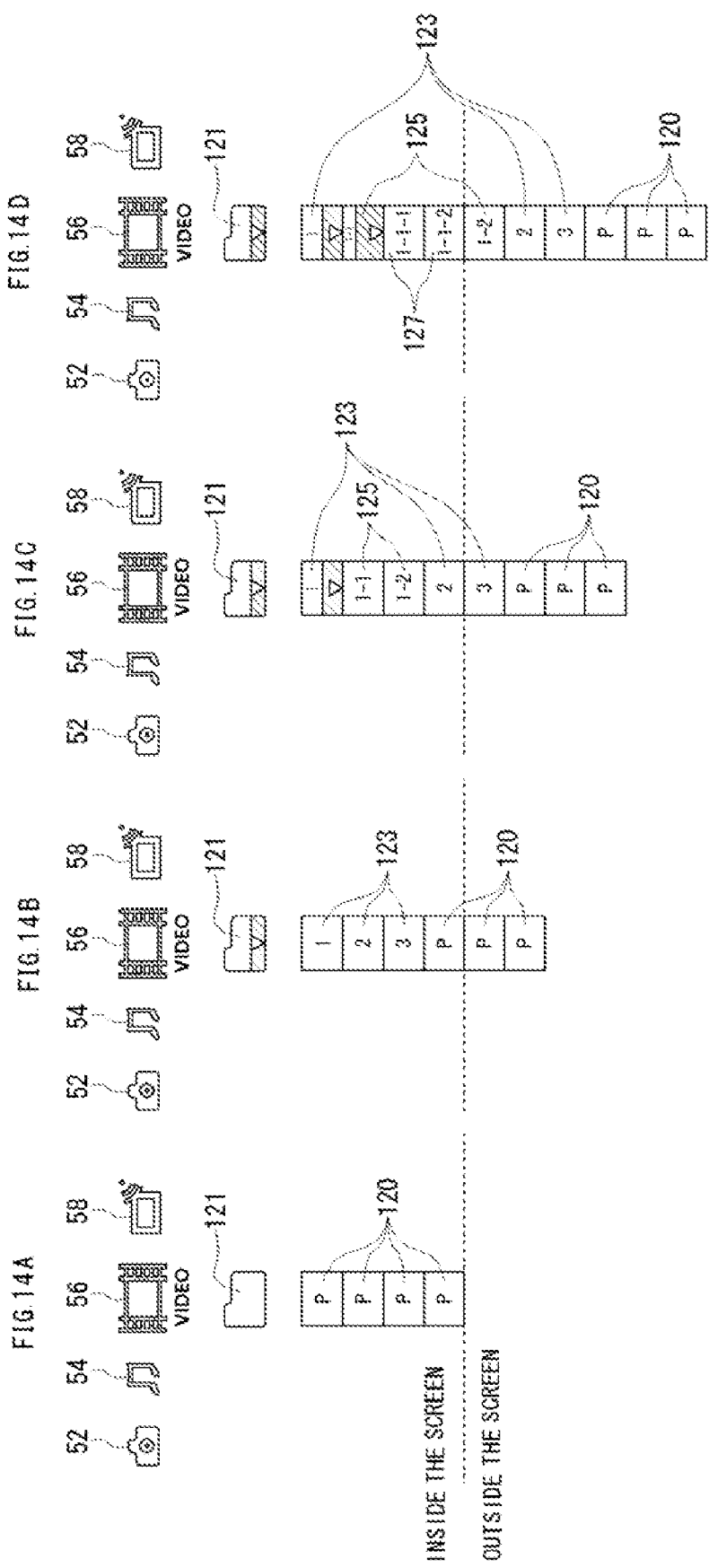

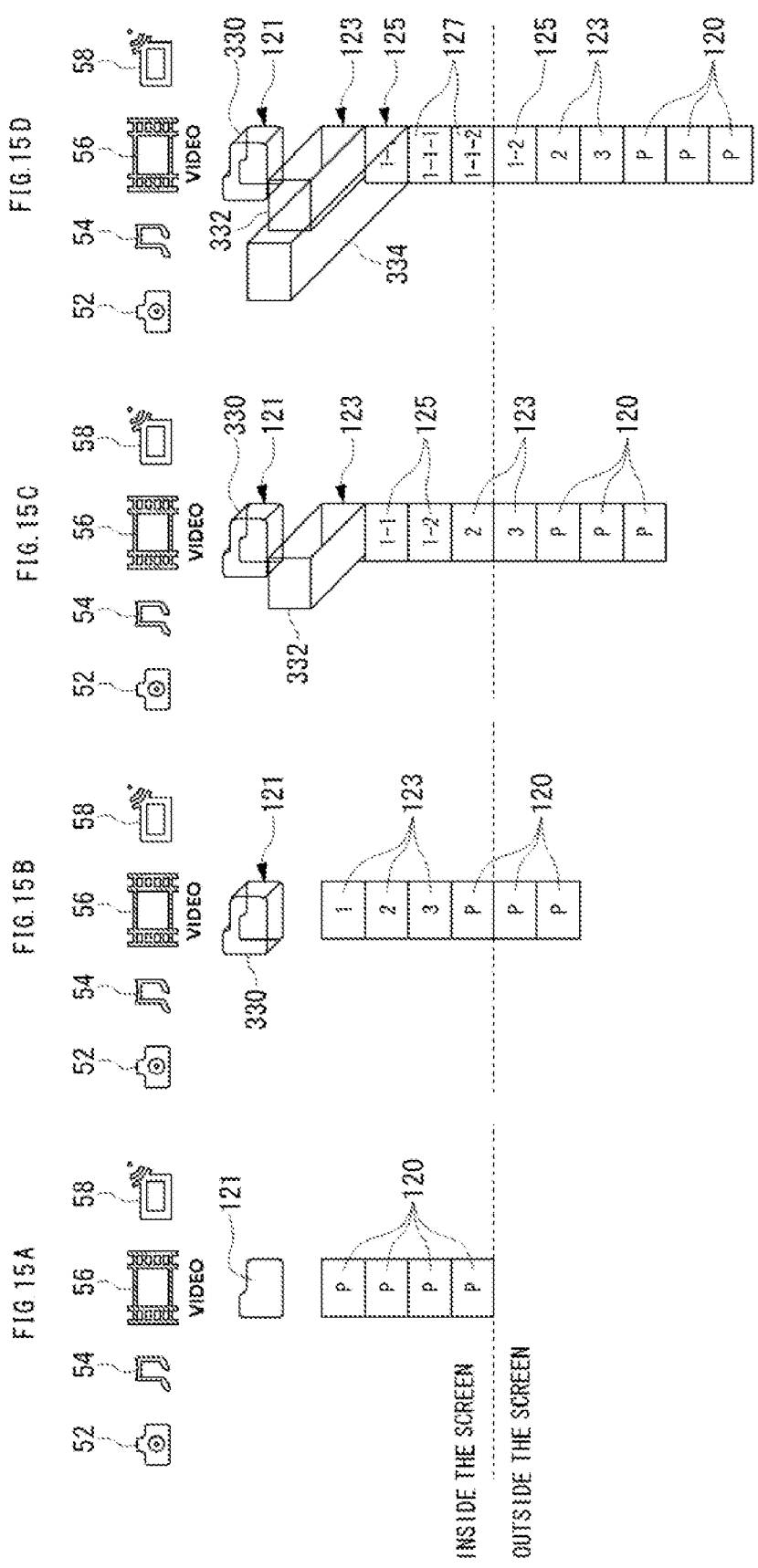

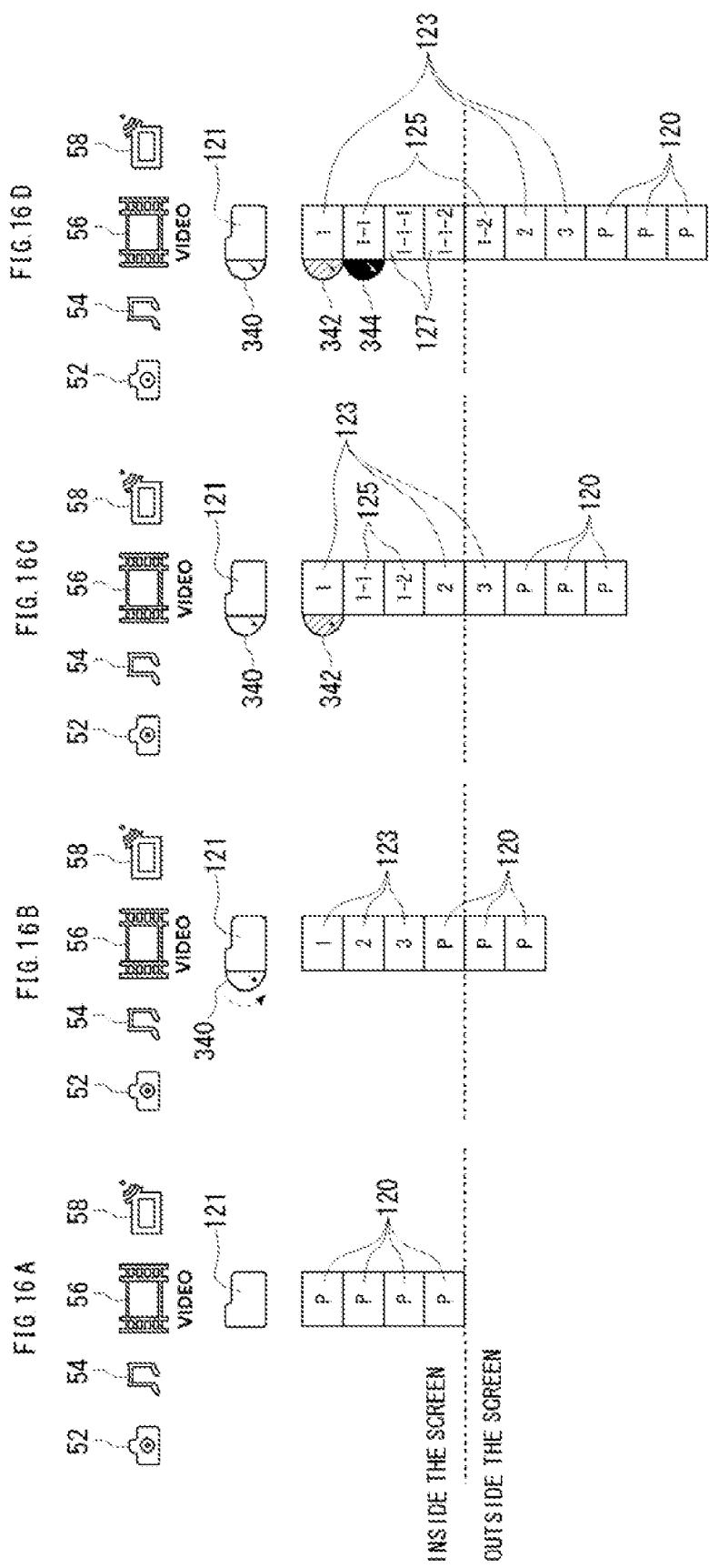

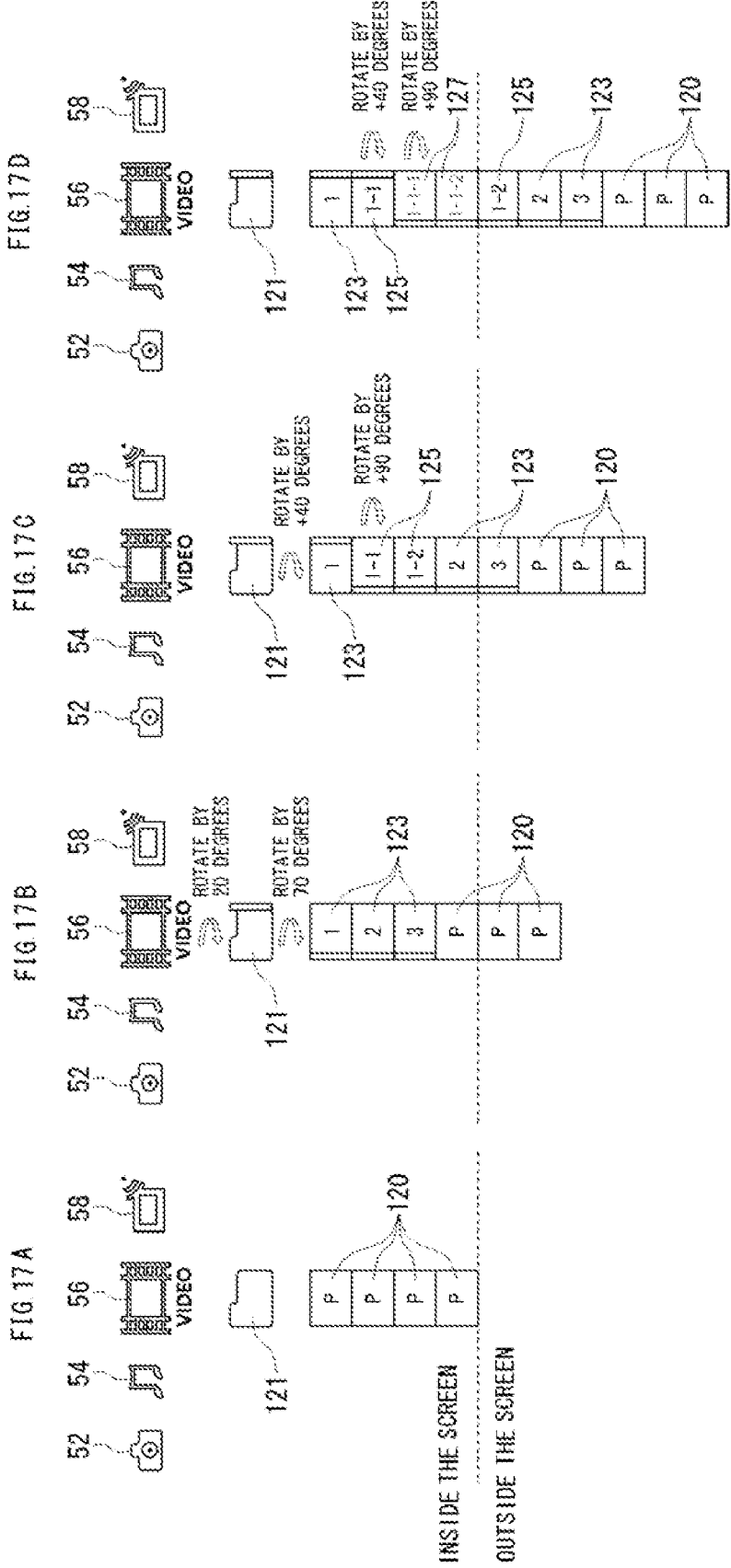

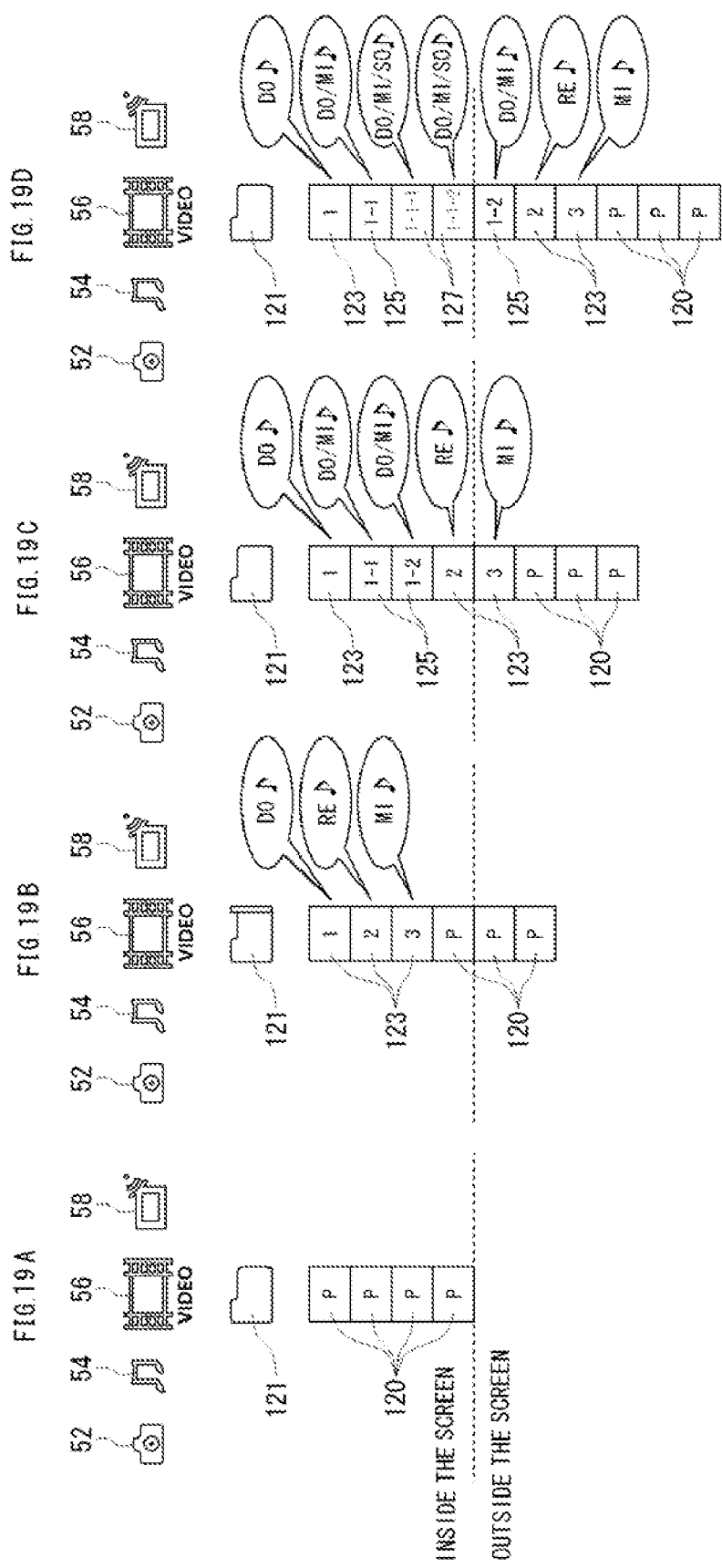

CONTENT PLAYER AND METHOD OF DISPLAYING ON-SCREEN MENU

This application is a National Phase Application of International Application No. PCT/JP2005/010123, filed Jun. 2, 2005, which claims the benefit under 35 U.S.C. 119(a-e) of Japanese Application No. 2004-181724 filed Jun. 18, 2004, which is herein incorporated by reference.

TECHNICAL FIELD

The present invention relates to a content player and a method of displaying on-screen menu. More particularly, the present invention relates to a user interface technology for giving an instruction to play contents.

BACKGROUND TECHNOLOGY

Recently, the variety of so-called digital home appliances is growing. For example, a hard disk recorder, a digital versatile disk (DVD) recorder or a multiple function hard disk recorder and DVD recorder is available for use in recording television programs. Also, in addition to playing ordinary compact disks (CDs), various forms of music playing are now available such as reproducing compressed data recorded in various kinds of memory cards or a hard disk.

DISCLOSURE OF THE INVENTION

Digital home appliances and, more particularly, appliances for playing images or music, are expected to be used by multiple people at the same time. As such, they are often placed in a shared space at home such as a living room, unlike personal computers. A control panel or a controller of a digital home appliance is usually designed with a small number of buttons and a narrow display area. Therefore, items for control are sometimes displayed on a television screen, which is separate from the appliance. One usually watches a television screen at some distance. Therefore, a string of characters in small sizes or movement of a small pointer as are displayed on a PC screen is not suitable for display on a television screen. Accordingly, favorable visual appearance and ease of operation are strongly required in the user interface of digital home appliances using a television screen. Particularly, non-PC users may not necessarily feel comfortable if a method of operation usually employed in PCs is used.

Meanwhile, as production cost has been reduced through technological innovation, the storage capacity of a digital home appliance is increasing year by year. As a result, the quantity of information dealt with by a single digital home appliance is rapidly increasing. Particularly, the variety and number of contents that can be stored in the appliance have grown. In order to manage a large quantity of contents efficiently, it is essential not only to improve the efficiency of managing the contents but also to use the appliance via a user interface which is intuitive and easy to use for users.

In this background, a general purpose of the present invention is to enhance user convenience in content playing.

A content player capable of playing contents according to one embodiment of the present invention comprises: a control which acquires an instruction for playing of contents via a user's manipulation; a storage which stores data for a plurality of function icons representing respective types of content playing functions, the content to be played by the player, and data for a plurality of content icons representing respective items of contents; a display output module which outputs image data for an on-screen menu related to playing of the content to a display device and which plays the content acquired from the storage in response to the user's instruction acquired by the control; a display controller which generates the image data for the on-screen menu with a two-dimensional array which includes a first array comprising the plurality of function icons arranged in a specific direction on a screen and which also includes a second array comprising the plurality of content icons in a direction intersecting the specific direction on the screen. The display controller displays the second array to intersect the first array at a position of one of the function icons selected by the user, and, if the contents are hierarchically stored in the storage, displays an expanded view of the content icons in the second array such that the hierarchy is represented visually or auditorily.

The term "content" refers to information including moving images, still images, audio, texts and programs that are played, displayed or run by respective types of information conveying means. The "content" may include information for entertainment purposes. The term "playing" may refer to running of a program as well as playing of images or audio.

If the contents are maintained hierarchically, relatively large areas would have to be occupied if the hierarchy is organized in a tree structure such as that used in PCs and multiple layers are displayed in an expanded view. According to this embodiment, the hierarchy is represented by occupying relatively small areas on the screen. Accordingly, a user interface which is easy to use as well as looking attractive is achieved.

Another embodiment of the present invention relates to a method of displaying an on-screen menu. The method is directed to displaying an on-screen menu in a content player and comprises: reading data for a plurality of function icons representing respective types of content playing functions, and data for a plurality of content icons representing respective items of contents; generating image data for the on-screen menu with a two-dimensional array which includes a first array comprising the plurality of function icons arranged in a specific direction on a screen and which also includes a second array comprising the plurality of content icons in a direction intersecting the specific direction on the screen; and outputting the image data for the on-screen menu related to playing of the content to a display device. The generating displays the second array to intersect the first array at a position of one of the function icons selected by the user, and, if the contents are hierarchically stored in the player, displays an expanded view of the content icons in the second array such that the hierarchy is represented visually or auditorily.

According to this embodiment, the hierarchy is represented by occupying relatively small areas on the screen. Accordingly, a user interface which is easy to use as well as looking attractive is achieved.

According to the present invention, user convenience in content playing is enhanced.

BRIEF DESCRIPTION OF THE DRAWINGS

FIGS. 7A-7D schematically show a method of representing the hierarchy of contents according to a second embodiment.

FIGS. 8A-8D schematically show another method of representation related to tags.

FIGS. 9A-9D schematically show a method of representing the hierarchy of contents according to a third embodiment.

FIGS. 10A-10D schematically show a method of representing the hierarchy of contents according to a fourth embodiment.

FIGS. 11A-11D schematically show a method of representing the hierarchy of contents according to a fifth embodiment.

FIGS. 12A-12D schematically show a method of representing the hierarchy of contents according to a sixth embodiment.

FIGS. 13A-13D schematically show a method of representing the hierarchy of contents according to a seventh embodiment.

FIGS. 14A-14D schematically show a method of representing the hierarchy of contents according to an eighth embodiment.

FIGS. 15A-15D schematically show a method of representing the hierarchy of contents according to a ninth embodiment.

FIGS. 16A-16D schematically show a method of representing the hierarchy of contents according to a tenth embodiment.

FIGS. 17A-17D schematically show a method of representing the hierarchy of contents according to an eleventh embodiment.

FIGS. 19A-19D schematically shows a method of representing the hierarchy of contents according to a twelfth embodiment.

20 content player, 30 television set, 40 control, 46 display output module, 48 display controller, 80 storage

BEST MODE FOR CARRYING OUT THE INVENTION

First Embodiment

A content player according a first embodiment of the present invention is a multifunction device capable of playing or running multiple types of contents such as still images, moving images, music, broadcast and games. The device is designed to use a screen of a television set. To manipulate the device, users use items displayed on a screen and directional buttons on a controller. In order to play multiple contents on a PC, programs, such as a viewer, dedicated to the content type need be used. These dedicated programs are produced by different vendors. Normally, they do not share a common interface nor provide consistent feel as the user uses the programs. Integrating these dedicated programs under a common interface such as a portal screen would merely result in aggregation. Further, because it requires more than a little time to start each program, users cannot comfortably switch between programs.

A content player according to the embodiment integrates playing of multiple types of contents under a common user interface, so as to offer vendor-independent operability to users. Moreover, user convenience is enhanced by offering an interface that achieves viewability appealing to the user's intuition and simple operation in order to allow users to learn the hierarchy which stores contents hierarchically.

Figure 1:
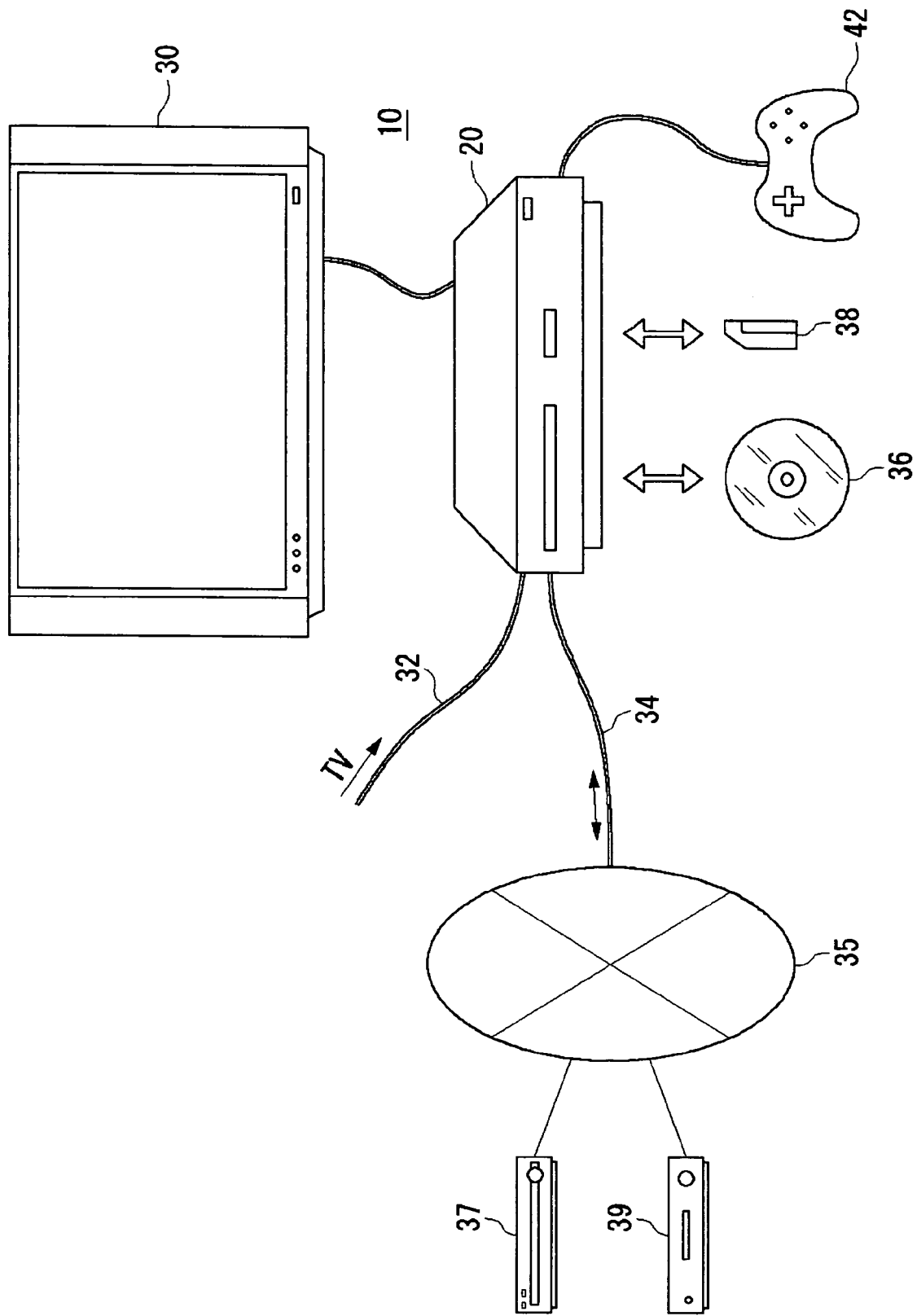
FIG. 1 shows the basic structure of contents playing system.

FIG. 1 shows the basic structure of a content playing system. A content player 20 plays a central role in a content playing system 10. A television set 30 and a controller 42 are connected to the content player 20. The television set 30 is provided with the function of displaying or outputting images or audio output from the content player 20 and is externally connected to the content player 20. The controller 42 is a device for acquiring an instruction related to playing of contents by being manipulated by a user. The controller 42 functions as part of the content playing system 10. The controller 42 may be implemented by a game controller as illustrated. Alternatively, the controller 42 may be implemented by a remote controller used to control various functions provided in the content player 20.

Information is input to the content player 20 via various recording mediums and cables. For example, information like images or audio of programs (broadcast contents) is input to the content player 20 via an antenna cable 32. Broadcast contents may be recorded by the content player 20 or subject to image processing by the content player 20 before being output to the television set 30. Contents stored in an external appliance connected to a LAN 35 are also input to the content player 20 via a network cable 34. FIG. 1 shows a first external appliance 37 and a second external appliance 39 as examples of external appliances connected to the LAN 35. Contents stored in the first external appliance 37 and the second external appliance 39 are input to the content player 20 via the network cable 34. The input contents are stored or buffered in the content player 20 before being played. The content player 20 allows the television set 30 to display an on-screen menu to provide an instruction to play contents. The on-screen menu shows items of contents stored in the content player 20 and items of contents stored in the first external appliance 37 or the second external appliance 39. The contents can be played by the content player 20 in accordance with a user's instruction.

The content player 20 is provided with the functions of accessing an optical disk 36 such as a DVD or a CD to read or write data and accessing a detachable memory card to read or write data. The content player 20 may read data for a movie or a music album from the optical disk 36 and may read data for images or videos from the memory card 38.

Figure 2:
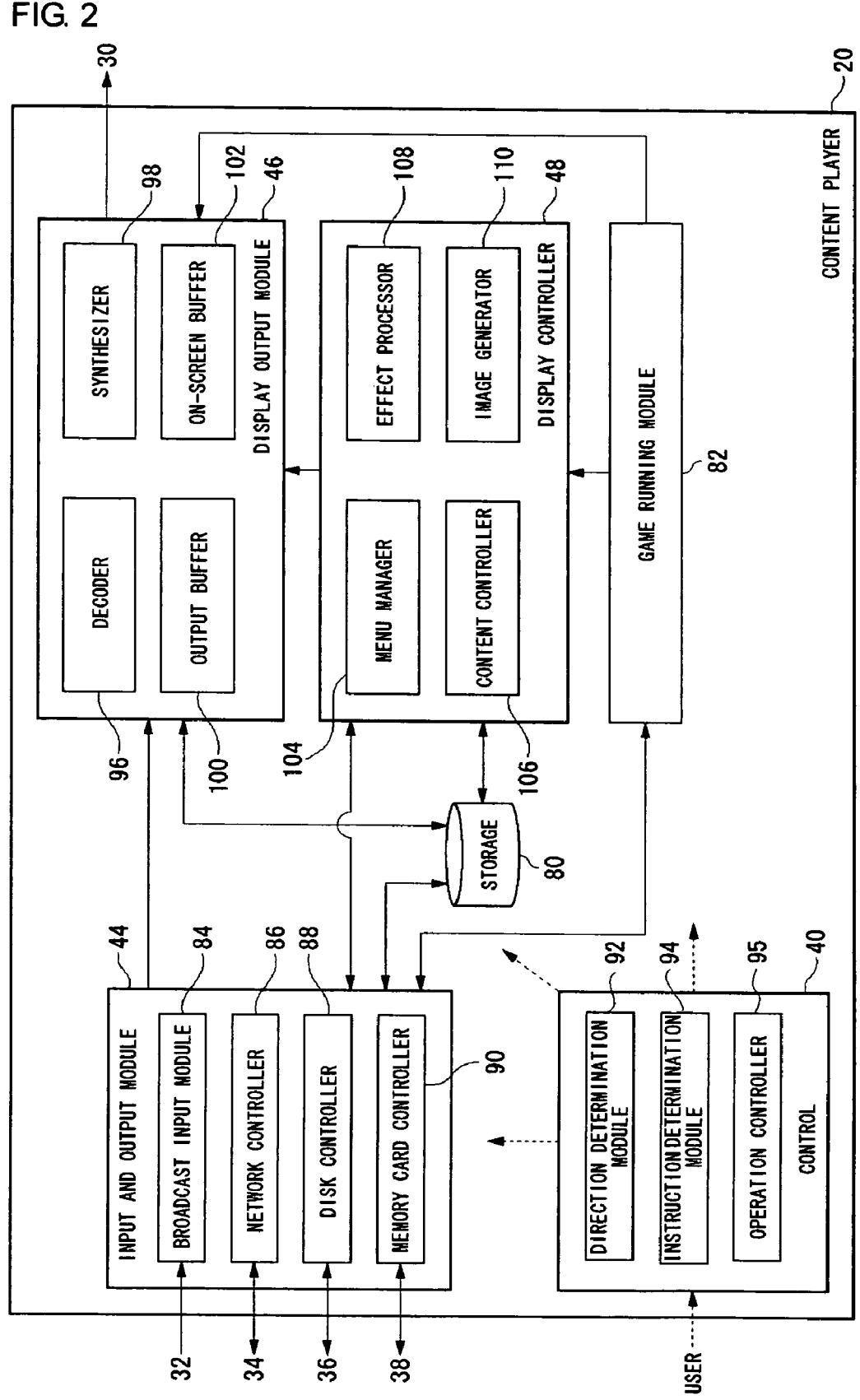
FIG. 2 is a functional block diagram showing the structure of a content player.

FIG. 2 is a functional block diagram showing the structure of the content player. The content player 20 comprises a control 40, an input and output module 44, a display output module 46, a display controller 48, a storage 80 and a game running module 82. The content player 20 is implemented hardwarewise by a CPU, hard disk, RAM, ROM, a rendering circuit, etc., and softwarewise by a program implementing the functions of data input, data latch, image processing, rendering, etc. FIG. 2 depicts functional blocks implemented by the coordination of hardware and software. Therefore, the functional blocks may be implemented by a variety of manners using a combination of hardware and software.

The control 40 includes a direction determination module 92, an instruction determination module 94 and an operation controller 95. The direction determination module 92 acquires instructions related to up/down/left/right directions entered by the user manipulating the controller 42. The instruction determination module 94 acquires instructions such as "content playing", "pause playing" and "invoke on-screen menu" entered by the user manipulating the controller 42. The operation controller 95 controls the input and output module 44, the display output module 46, the display controller 48 and the game running module 82 in accordance with the instructions acquired by the direction determination module 92 and the instruction determination module 94.

The input and output module 44 includes a broadcast input module 84, a network controller 86, a disk controller 88 and a memory card controller 90. The broadcast input module 84 receives broadcast contents via the antenna cable 32. The network controller 86 processes the input of the contents stored in external appliances and the output of various data via the network cable 34. The disk controller 88 controls the input of data stored in the optical disk 36 and the writing of data to the optical disk 36. The memory card controller 90 accesses the memory card 38 for data input and output. The network controller 86 detects an external appliance connected to the LAN 35. The network controller 86 acquires, from the external appliances thus detected including the first external appliance 37 and the second external appliance, information including: network information such as an IP address and a MAC address, names and IDs of the appliances; category IDs of contents stored; and thumbnails, names and data sizes of contents. The network controller 86 stores the information thus acquired in the storage 80. Data input via various components constituting the input and output module 44 is sent to the display output module 46, the display controller 48, the storage 80 and the game running module 82.

The storage unit 80 stores broadcast contents input via the antenna cable 32, contents in the external appliances input via the network cable 34, contents like music and movie read from the optical disk 36, and contents like still images and moving images read from the memory card 38. The storage 80 further stores data for multiple function icons representing the respective types of playing functions, contents played by the display output module 46 and contents run by the game running module 82, and data for multiple content icons representing the respective items of contents stored in the storage 80. The contents stored in the storage are categorized with respect to the method of playing or the category of the contents and are maintained in a hierarchy in the storage 80. Content icons representing the items of contents stored in the external appliances, the optical disk 36 and the memory card 38 are acquired by the network controller 86, the disk controller 88 and the memory card controller 90, respectively, from the first external appliance 37, the second external appliance 39, the optical disk 36 and the memory card 38 and stored in the storage 80. The function icons and the content icons are used to display items of the on-screen menu.

The display output module 46 includes a decoder 96, an output buffer 100, an on-screen buffer 102 and a synthesizer 98. The decoder 96 decodes coded data. The output buffer 100 temporarily stores playing data before sending it to the television set 30. The on-screen buffer 102 temporarily stores image data for on-screen display before outputting the same to the television set 30. The synthesizer synthesizes the playing data and the image data. The decoder 96 decodes coded data like broadcast contents, movie, music and the like received from the input and output module 44 or the storage 80, in accordance with the user's instruction acquired by the control 40, and stores the decoded data to the output buffer 100. The on-screen buffer 102 temporarily stores, for example, the image data for the on-screen menu generated by the display controller 48, as the image data for on-screen display. A synthesizer 98 synthesizes the playing data stored in the output buffer 100 and the image data for the on-screen menu stored in the on-screen buffer 102 and converts the synthesized data into an analog signal before outputting the same to the television set 30. When audio is to be played in synchronization with the image displayed on the television set 30, the display controller 48 outputs associated audio data to the television set 30.

The display controller 48 includes a menu manager 104, a content controller 106, an effect processor 108 and an image generator 110. The menu manager 104 manages the types of playing functions and items of contents corresponding to the respective playing functions as menu items. The content controller 106 controls playing or running of the contents. The effect processor 108 processes operations related to icons in an on-screen menu. The image generator 110 generates image data for an on-screen menu. The menu manager 104 maintains a list of items of contents stored in the storage 80 and items of contents input via the input and output module 44, and also maintains current selections of a playing function type and item of content. The playing function includes, for example, still image playing function, music playing function, moving image playing function, broadcast display function and game running function. Further, it includes various configuration functions. In accordance with the user's instruction acquired by the control 40, the content controller 106 controls switching between playing functions, start and stop of content playing, data input via the input and output module 44, reading of data from the storage 80 and processes performed by the game running module 82.

The image generator 110 generates an on-screen menu constituted by an array of multiple function icons arranged horizontally and an array of multiple content icons arranged vertically. These two arrays intersect each other practically at the center of the screen. The image generator 110 visually highlights the function icon and the content icon that are displayed at the intersection and in the neighborhood of the intersection to distinguish them from the other icons. The effect processor 108 scrolls the array of function icons and the array of content icons and highlights function icons and content icons in focus. An icon may be highlighted by a format of representation different from that the other icons. For example, an icon may be highlighted by a distinguishing color, change in color, enlarged view or transition to an enlarged view. The effect processor 108 displays the array of a plurality of content icons in a mode compatible with the hierarchy. That is, the effect processor 108 displays multiple contents hierarchically in a relatively small and limited space represented by intersecting arrays, as well as displaying an expanded view of the array of contents layer by layer. The effect processor 108 also outputs audio in synchronization with the expansion or display of content icons.

The game running module 82 runs a game program read from the small optical disk 86 by the disk controller 88 or a game program read from the storage 80. In accordance with the user's instruction acquired by the control 40, the game running module 82 processes operations related to the game program and sends game images and audio to the display output module 46.

Figure 3:
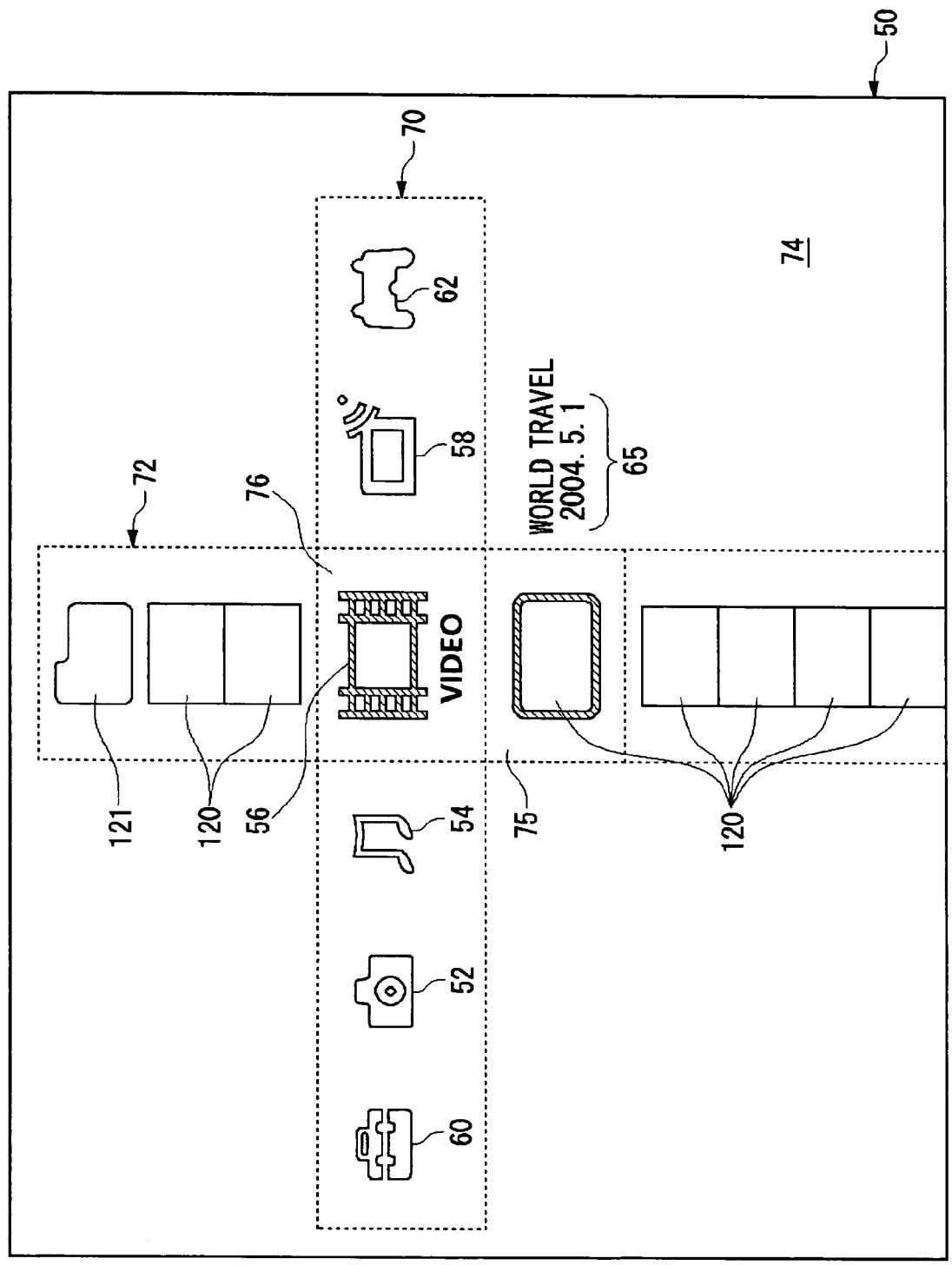
FIG. 3 shows the configuration of an on-screen menu generated by the content player.

FIG. 3 shows the configuration of an on-screen menu generated by the content player 20. In an on-screen menu 50, there are displayed a two-dimensional array in which intersect an array of function icons 70 in which multiple function icons are arranged horizontally and an array of content icons 72 in which multiple medium icons are arranged vertically. The array of function icons 70 includes icons representing the types of playing functions that the content player 20 is provided with. The array includes a photo icon 52, a music icon 54, a moving image icon 56, a broadcast icon 58, a game icon 62 and a configuration icon 60. The array of content icons 72 includes as icons thumbnails of multiple contents stored in the storage 80. The on-screen menu 50 comprised of the array of function icons 70 and the array of content icons 72 is presented as on-screen display. Normally, the menu is superimposed as a foreground of the content image. In case a content image currently reproduced is displayed in a background area 74, the effect processor 108 may apply a color to the entirety of areas where the array of function icons 70 and the array of content icons 72 are displayed, to distinguish the areas from the background area 74. Distinction in appearance may be effected by other methods including adjusting brightness of the content image.

The function icon located at the intersection of the array of function icons 70 and the array of content icons 72 is highlighted by a color different from that of the other function icons and by an enlarged view, as in the case of the moving image icon 56 illustrated. An area of intersection 76 is made to remain practically at the center of the on-screen menu 50. The entirety of the array of function icons 70 is moved left or right in accordance with the user's instruction via the control 40 to move left or right. As the array is moved, the color and size of the function icon located in the area of intersection 76 change. The user can select a desired playing function merely by specifying left or right. There is no need to provide a decision-making instruction such as a click of a mouse normally performed by a PC user.

The effect processor 108 moves the function icons left or right by scrolling the entirety of the array of function icons 70 left or right. The effect processor 108 displays the function icons in the same color and same size as they are moved left or right. The effect processor 108 changes the color and size of the function icon located in the area of intersection 76. The effect processor 108 may change such attributes as brightness, chroma, hue, etc. of the function icon. Alternatively, the color may be changed by allowing the icon to flash. By displaying the function icon located in the area of intersection 76 in a display format different from that of the other function icons, the user can easily select a medium.

When the function icons are being moved left or right and none of the function icons is being located in the area of intersection 76, the effect processor 108 does not display the array of content icons 72. When one of the function icons is located in the area of intersection 76, the effect processor 108 shows an expanded view of the vertical array of content icons 72 above and below the area of intersection 76. The user can identify contents corresponding to the playing function merely by scrolling the function icons left or right, with the area of intersection 76 as a target area. The user can also identify the type of playing function by viewing the contents displayed in an expanded view. When there is an instruction to move left or right while the array of content icons 72 is being displayed, the effect processor 108 allows the expanded view of the array of content icons 72 to collapse toward the area of intersection 76.

An area in focus of attention (hereinafter, simply referred to as an area in focus) 75 is an area where the icon of the content subject to the user's manipulation is to be displayed. The area in focus 75 is placed practically at the center of the on-screen menu 50. The image processor 110 displays the array of function icons 70 such that the area of intersection 76 is located in the neighborhood of the area in focus 75, i.e., immediately above the area in focus 75. The area in focus 75 constitutes the array of content icons 72. The effect processor 108 displays an enlarged version of the content icon located in the area in focus 75. The other content icons are displayed in smaller size than the content icon in the area in focus 75. In the neighborhood (i.e., to the right) of the area in focus 75, content information 65 such as the title of a movie and the date of recording is displayed as attributes of the content located in the area in focus 75.

While the control 40 acquires the user's instruction to move up or down, the content icons are moved up or down in accordance with the instruction. The effect processor 108 moves the content icons up or down by scrolling the entirety of the array of content icons 72 up or down.

The effect processor 108 displays the content icons in the same size as they are moved up or down except that the effect processor 108 displays an enlarged version of the content icon located in the area in focus 75. The effect processor 108 may further modify such attributes as brightness, chroma, hue, etc. of the content icon in the area in focus 75. Alternatively, the effect processor 108 may allow the content icon to flash. When the control 40 acquires an instruction from the user designating playing of the content displayed in the area in focus 75, the image-generator 110 places the image data for the on-screen menu in a non-display mode and the content controller 106 starts playing the selected content. When the user invokes the on-screen menu via the control 40 while the content is being played, the on-screen menu is superimposed on the content being played. The appearance of the menu that occurred when the content was selected for playing is maintained in the on-screen menu thus displayed.

The image generator 110 displays the array of function icons 70 slightly above the vertical center of the on-screen menu 50 and displays the array of content icons 72 slightly to the left of the horizontal center of the on-screen menu 50. This causes a combination of the content icon in the area in focus 75 and the content information 65 to be displayed practically at the center of the on-screen menu 50. The user can view the content icon and the content information 65, which should be the focuses of attention, at the center of the on-screen menu 50 and can easily recognize what they teach.

A photo icon 52 is an icon that represents the still image playing function and is selected to play a still image. The image played is primarily a still image captured by a digital camera which is read from, for example, the memory card 38. The content icon displayed in an expanded view when the photo icon 52 is located in the area of intersection 76 is a thumbnail of the still image. The content information 65 may include shooting information such as the date of shooting and a file size.

A music icon 54 is an icon that represents the music playing function and is selected to play music data. The music data played is generated, for example, by coding data read from the optical disk 36 in a specific compression format. The content icon displayed in an expanded view when the music icon 54 is located in the area of intersection 76 may be in units of music pieces or in units of albums. The content information 65 may include the title of a music piece or an album, playing time, etc. The music data may include moving image data such as a promotional video for the music. In this case, the thumbnail thereof may be used as the content icon.

A moving image icon 56 is an icon that represents the moving image playing function and is selected to play moving images. The image played may be recorded images taken from a television program and input via the antenna cable 32, recorded images captured by a digital video camera or images read from the optical disk 36 or the external appliance. Thumbnails produced by scaling down frames included in the moving images are used as a content icon. The content information 65 may include the date of recording or playing time.

A broadcast icon 58 is an icon that represents the broadcast display function and is selected to view a television program input via the antenna cable 32. The content icon displayed in an expanded view as a target of viewing may be in units of programs, in units of broadcasting station, or in units of broadcast channels. The content information 65 may include the name of a broadcasting station, the name of a broadcast channel, the title of a program or broadcast schedule acquired based on Electronic Program Guide (EPG) data.

A game icon 62 is an icon that represents the game running function and is selected to run a game program. The game program which is run is stored in the storage 80 or read from the optical disk 36. If the game program contains data for a game icon, the icon is displayed as a content icon. The content information 65 may include information such as the title of the game program.

A configuration icon 60 is an icon that represents the function for various configurations and is selected to change various configurations in the content player 20.

The content icons included in the array of content icons 72 of the embodiment comprise a mixture of icons representing items of contents acquired from the storage 80 and items of contents acquired from the external appliance such as the first external appliance 37 or the second external appliance 39 connected via the network cable 34. The storage 80 and the external appliances store a hierarchy of multiple contents. The array of content icons 72 includes a folder icon 121 to represent the hierarchy of multiple contents. When the control 40 acquires the user's instruction to select the folder icon 121, the effect processor 108 displays an expanded view of the content icons accommodated by the folder icon 121. The hierarchy of contents may include multiple layers. In this case, the effect processor 108 displays the folder icon 121 in the lower layer as it expands the folder icon 121. When the control 40 acquires the user's instruction for playing while one of the content icons 120 is being selected, the content controller 106 starts playing the content represented by the selected content icon.

Figure 4:
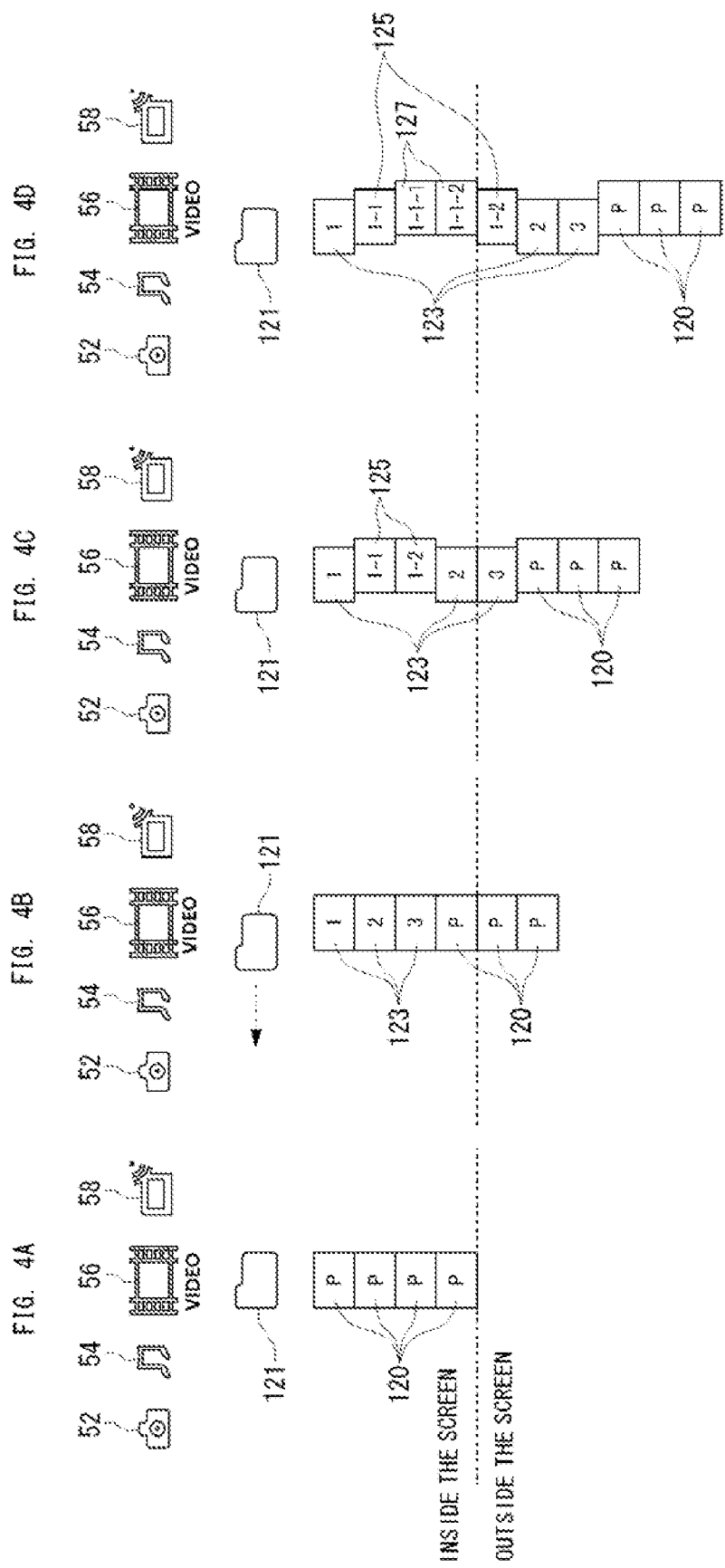
FIGS. 4A-4D schematically show a method of representing the hierarchy of contents according to a first embodiment.

FIGS. 4A-4D schematically show a method of representing the hierarchy of contents according to a first embodiment. FIG. 4A shows a state prior to expanding the folder icon 121. When the control 40 acquires the user's instruction for expansion while the folder icon 121 is being selected, the effect processor 108 moves the folder icon 121 slightly to the left, as shown in FIG. 4B. This produces a horizontal displacement between the folder icon 121 and the moving image icon 56 and between the folder icon 121 and the content icons 120. In addition to displacing the folder icon 121, the effect processor 108 displays an expanded view of items 123 in the first layer, which are contents accommodated by the folder icon 121. More specifically, the effect processor 108 moves the content icons 120 down so as to display an expanded view of the items 123 by displaying the items 123 in a space created between the folder icon 121 and the content icons 120. The items 123 may represent the folders in the first layer or the contents in the first layer. When the control 40 receives an instruction to move up or down in this state, the effect processor 108 scrolls the entirety of the folder icon 121, the items 123 and the content icons 120 vertically.

Referring to FIG. 4B, the item 123 marked "1" represent a folder. When an instruction to expand the folder is given, the effect processor 108 moves the folder icon 121 slightly to the left and also moves the three items 123 slightly to the left, as shown in FIG. 4C. As a result, the folder icon 121 is displaced by two steps and the items 123 are displaced by one step. The effect processor 108 moves the item 123 marked "2" and subsequent items down so as to display an expanded view of items 125 in the second layer, which are contents accommodated by the item 123 marked "1", in a space created between the items 123 marked "1" and "2". When the control 40 receives an instruction to move up or down in this state, the effect processor 108 scrolls the entirety of the folder icon 121, the items 123, the items 125 and the content icons 120 vertically.

When an instruction to expand the folder marked "1-1" is given, the effect processor 108 further moves the folder icon 121, the items 123 and the items 125 slightly to the left, as shown in FIG. 4D. As a result, the folder icon 121 is displaced by three steps, the items 123 is displaced by two steps and the items 125 are displaced by one step. The effect processor 108 moves the item 125 marked "1-1" and subsequent items down so as to display an expanded view of items 127 in the third layer, which are contents accommodated by the item 125 marked "1-1", in a space created between the items 125 marked "1-1" and "1-2". Thus, horizontal displacements are provided between the positions of icons so that differences in layers are represented by the magnitude of displacements. When the control 40 receives an instruction to move up or down in this state, the effect processor 108 scrolls the entirety of the folder icon 121, the items 123, the items 125, the items 127 and the content icons 120 vertically.

The folder icon 121 may represent an external device on the LAN 35 such as the first external appliance 37 or the second external appliance 39. In this case, when the user's instruction is given to expand the folder icon 121, which represents the external device, an expanded view of the content icons of the contents stored in the external device is displayed, as shown in FIGS. 4A-4D. Hereinafter, the term "folder" may also refer to "an external device" as an embodiment.

Figure 5:
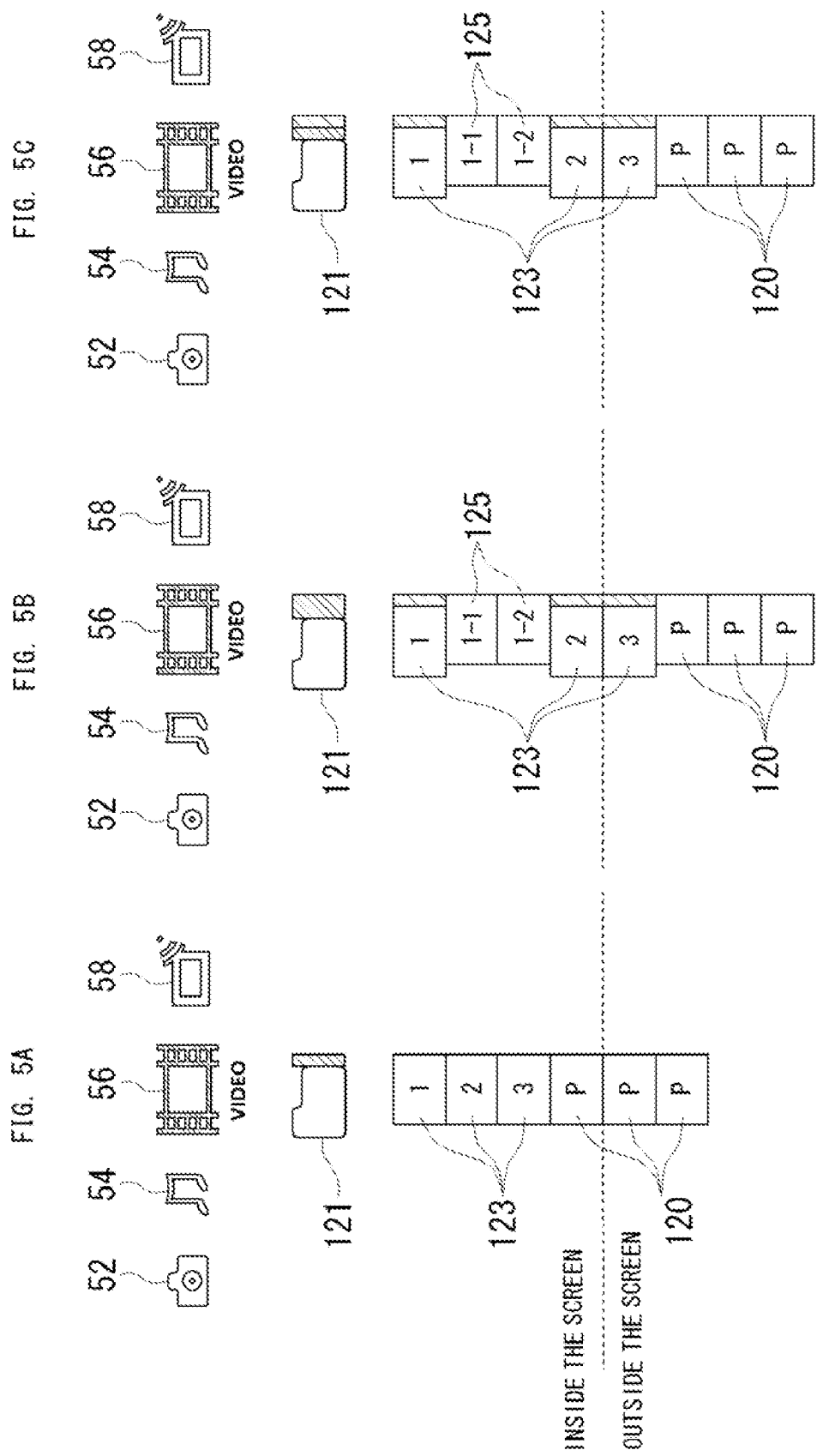
FIGS. 5A-5C schematically show another mode of representation according to the first embodiment related to displacements between icons.

FIGS. 5A-5C schematically show another mode of representation according to the first embodiment related to displacements between icons. The icons according to the first embodiment may also be represented as illustrated. Similarly, to FIG. 4B, FIG. 5A shows a state in which an expanded view of the items 123 in the first layer is displayed. As the effect processor 108 moves the folder icon 121 to the left, it attaches a tag with a width determined by the displacement to the folder icon 121. Similarly to FIG. 4C, FIG. 5B shows a state in which an expanded view of the items 125 in the second layer is displayed. As the effect processor 108 moves the folder icon 121 and the items 123 to the left, it attaches tags with a width determined by the displacements from the initial state to the folder icon 121 and the items 123. For example, a tag with a width determined by the displacement by two steps is attached to the folder icon 121 and a tag with a width determined by the displacement by one step is attached to the items 123. The color of the tag attached to the icons varies depending on the extent of displacement, i.e., the depth of layer. Similarly to FIG. 4C, FIG. 5C shows a state in which an expanded view of the items 125 in the second layer is displayed. A different style of tags is used as compared with FIG. 5B. That is, the number of tags attached to the icons depends on the depth of layer and the color thereof varies as well from layer to layer. For example, two tags are attached to the folder icon 121 in association with the displacement by two steps, and one tag is attached to the items 123 in association with the displacement by one step.

Thus, by attaching tags with different widths and colors to the icons in addition to representing the hierarchy of contents by displacements in the positions of icons, viewability is improved. In this way, an intersection of the array of function icons 70 and the array of content icons 72 is maintained as the style of menu display. The hierarchy of multiple contents is represented in a small space without giving a disorganized appearance, and the user can understand the hierarchy at a glance.

Figure 6:
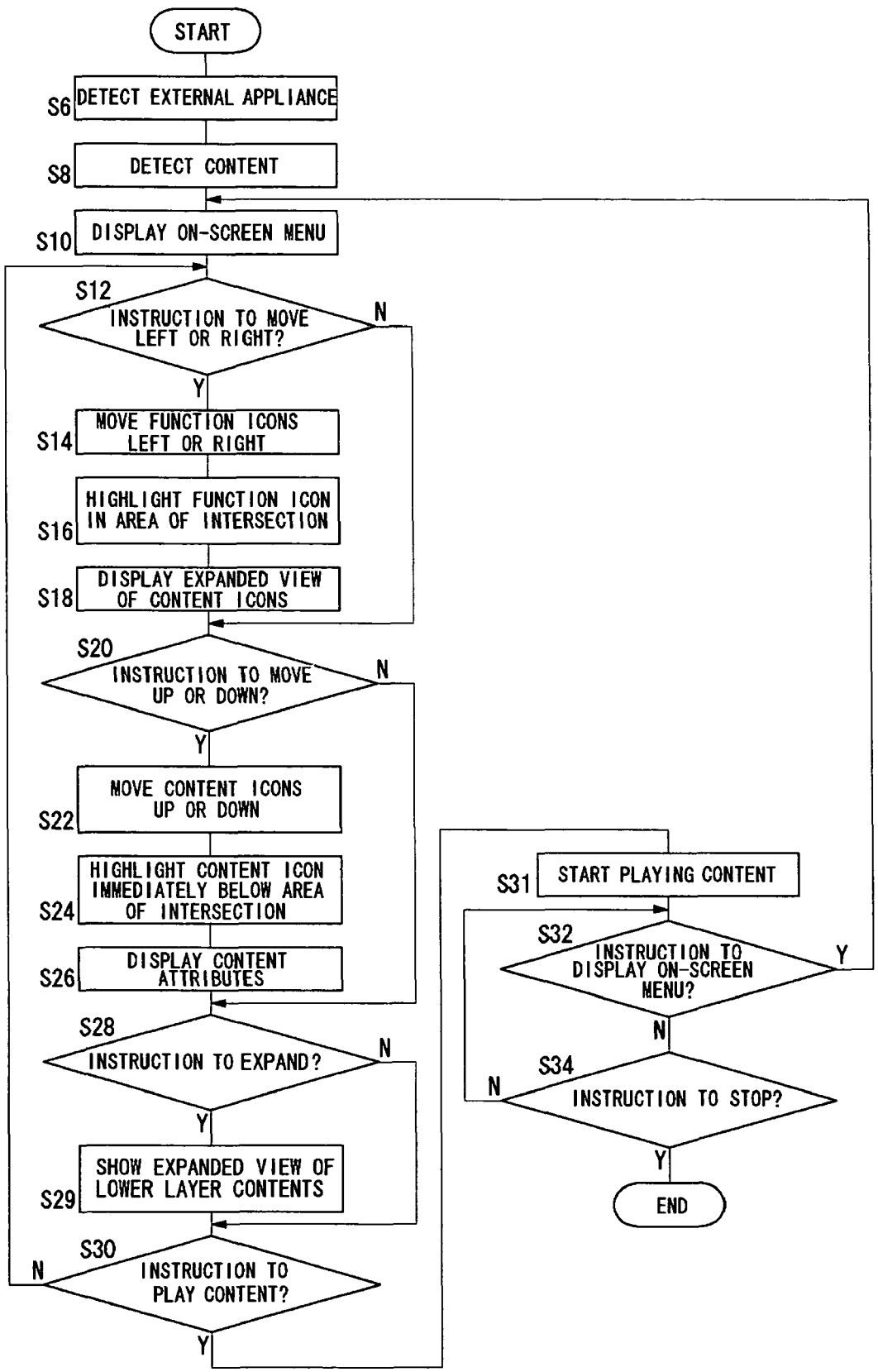
FIG. 6 is a flowchart showing the operating process of the content player.

FIG. 6 is a flowchart showing the operating process of the content player. When the user turns on the power of the multimedia player 20, the network controller 86 detects external appliances on the LAN 35 via the network cable 34 (S6) and detects items of contents from the external appliances and the storage 80 (S8). The image generator 110 acquires items such as function icons and content icons from the storage 80 so as to generate the on-screen menu. The display output module 46 causes the television set 30 to display the on-screen menu (S10). When the control 40 acquires the user's instruction to move left or right (S12Y), the effect processor 108 moves the function icons left or right in accordance with the instruction (S14) and highlights the function icon located in the area of intersection 76 (S16). Further, the effect processor 108 reads from the storage 80 or the external appliance the content icons corresponding to the highlighted playing function and shows a vertically expanded view of the content icons thus read (S18). While there is no instruction from the user to move left or right, steps S14-S18 are skipped (S12N).

When the control 40 acquires the user's instruction to move up or down (S20Y), the effect processor 108 responds to the instruction by moving the content icons up or down (S22), highlighting the content icon located in the area in focus 75 (S24) immediately below the area of intersection 76 and displaying associated content information to the right (S26). While there is no instruction from the user to move up or down, steps S22-S26 are skipped (S20N). When the control 40 acquires the user's instruction to expand the folder (S28Y), the effect processor 108 displays an expanded view of content icons in the layer below the selected folder (S29).

Steps S12-S26 are repeated until the control 40 acquires the user's instruction to play contents (S30N). When the control 40 acquires an instruction to play contents (S30Y), the content controller 106 starts playing the highlighted content in the area in focus 75 (S31). When the control 40 acquires the user's instruction to invoke the on-screen menu 50 while the content is being played (S32Y), control jumps to S10, whereupon the steps S10-S28 are repeated. Absent the instruction from the user to invoke the on-screen menu, the content continues to be played (S32N). When the control 40 acquires an instruction from the user to stop playing the content while the content is being played, the content controller 106 stops playing the content (S34Y).

As described above, the content player 20 displays, in the on-screen menu 50, menu images comprising the array of function icons and the array of contents. The array of function icons 70 and the array of content icons 72 actually displayed each comprise a single line or a single row. By scrolling up, down, left or right, icons for different contents corresponding to different playing functions are displayed one after another. Therefore, an appearance of a large number of contents being displayed in a matrix over the entirety of the screen is given to the user. The user can select content as if by focusing on a desired content while the user moves a matrix of a large number of contents as desired. Meanwhile, the number of icons actually displayed is relatively small, and the representation of the hierarchy is accommodated in a single array even when the contents are stored hierarchically. Therefore, a disorganized appearance is prevented. The user can select one item of content after another merely by specifying up, down, left or right and so can enjoy comfortable and easy zapping. Since the icon in focus 64 continues to be located practically at the center of the on-screen menu 50, the user can select contents as if by looking at a desired content through a window provided at the center of the on-screen menu 50. Even when the player is remotely operated by the user away from the on-screen menu 50, the location of the icon in focus 64 is immediately identified. As it is not necessary for the user to look for the icon in focus 64 in the on-screen menu 50, an environment is offered in which the user can navigate through the menu in a relaxed manner.

Second Embodiment

The method of representation in a second embodiment is similar to that of the first embodiment in that tags are attached to content icons but differs from the first embodiment in respect of the style of tags such as the size thereof. The following description focuses on the difference from the first embodiment.

FIGS. 7A-7D schematically show a method of representing the hierarchy of contents according to the second embodiment. FIG. 7A shows a state prior to expanding the folder icon 121. FIG. 7B shows a state in which the folder icon 121 is expanded so that the items 123 are displayed. The effect processor 108 attaches first tags 300 to the folder icon 121 and the items 123 to indicate that they are targets of expansion in the first layer. In this process, tags are not attached to the content icons independently but are attached to the whole of targets of expansion as a unit.

When the control 40 acquires an instruction to expand the item 123 marked "1", the effect processor 108 moves the item 123 marked "2" and subsequent items down in order to create a space between the item 123 marked "1" and the item 123 marked "2" so as to display the items 125 in a space thus created. The effect processor 108 attaches second tags 302 to the item 123 marked "1" and the items 125 to indicate that they are targets of expansion in the second layer. The color of the second tags 302 differs from that of the first tags 300, and the difference in color represents the difference in layers.

When the control 40 acquires an instruction to expand the item 125 marked "1-1", the effect processor 108 moves the item 125 marked "1-2" and subsequent items down in order to create a space between the item 125 marked "1-1" and the item 125 marked "1-2" so as to display the items 127 in a space thus created. The effect processor 108 attaches third tags 304 to the item 125 marked "1-1" and the items 127 to indicate that they are targets of expansion in the third layer. The color of the third tags 304 differs from that of the first tags 300 and the second tags 302, and the difference in color represents the difference in layers.

As a result, the first tag 300, the second tag 302 and the third tag 304 are accumulatively attached to the items 125 marked "1-1" and the items 127, which are targets of three steps of expansion. The first tag 300 and the second tag 302 are accumulatively attached to the item 123 marked "1" and the items 125, which are targets of two steps of expansion. Only the first tag 300 is attached to the folder icon 121 and the items 123 marked "2" and "3", which are targets of only one step of expansion. In this way, the user can easily understand the number of steps of expansion or the depth of layer by the difference in the number of tags attached and the color thereof.

FIGS. 8A-8D schematically show another method of representation related to tags. Similarly to FIG. 7C, FIG. 8A shows how tags different in color are attached to content icons depending on the number of steps of expansion. The number of tags also depends on the number of steps of expansion. In the example of FIG. 7C, the second tags 302 are sandwiched between the first tags 300 and the icons. In contrast, FIG. 8A shows a representation in which the second tags 302 are added outside of the first tag 300. FIG. 8B shows a representation in which the second tags 302 are added outside of the first tags 300 and the third tags 304 are further added outside of the second tags 302.

In the examples of FIGS. 8A and 8B, the first tags 300, the second tags 302 and the third tags 304 are attached only to one of the sides (i.e., the left side) of the content icons. In the examples of FIGS. 8C and 8D, the first tags 300, the second tags 302 and the third tags 304 are attached to both sides of the content icons, resulting in a more striking visual presentation. Thus, by attaching tags that are different in color or size depending on the number of steps of expansion, the hierarchy of contents is represented in a single column and an interface of an on-screen menu without a disorganized appearance can be achieved.

Third Embodiment

The method of representation in a third embodiment is similar to that of the first and second embodiments in that tags are attached to content icons but differs from the first and second embodiments in respect of the method of attaching tags. The following description focuses on the difference from the first and second embodiments.

FIGS. 9A-9D schematically show a method of representing the hierarchy of contents according to the third embodiment. FIG. 9A shows a state prior to expanding the folder icon 121. FIG. 9B shows a state in which the folder icon 121 is expanded so that the items 123 are displayed. The effect processor 108 attaches the first tags 300 to the folder icon 121 and the items 123 to indicate that they are targets of expansion in the first layer. In this process, tags are not attached to the content icons independently but are attached to the whole of targets of expansion as a unit. In this respect, the third embodiment is similar to the second embodiment but differs from it in that the first tags 300 are attached to the right and left of the folder icon 121, which indicates the source for expansion. The items 123 displayed in an expanded view have the first tags 300 attached only to one side (to the left) thereof.

When the control 40 acquires an instruction to expand the item 123 marked "1", the effect processor 108 moves the item 123 marked "2" and subsequent items down and displays the items 125 in a space thus created, as shown in FIG. 9C. The effect processor 108 attaches the second tags 302 to the item 123 marked "1" and the items 125 to indicate that they are targets of expansion in the second layer. The item 123 marked "1", which represents the source folder for expansion, has the second tags 302 attached to both sides thereof. The items 125 displayed in an expanded view have the second tags 302 attached only to one side (to the left) thereof.

When the control 40 acquires an instruction to expand the item 125 marked "1-1", the effect processor 108 moves the item 125 marked "1-2" and subsequent items down and displays the items 127 in a space thus created, as shown in FIG. 9D. The effect processor 108 attaches the third tags 304 to the item 125 marked "1-1" and the items 127 to indicate that they are targets of expansion in the third layer. The item 125 marked "1-1", which represents the source folder for expansion, has the third tags 304 attached to both sides thereof. The items 127 displayed in an expanded view have the third tags 304 attached only to one side (to the left) thereof. The first tags 300, the second tags 302 and the third tags 304 differ in color.

According to the third embodiment, the user can easily understand the number of steps of expansion or the depth of layer by the difference in the number of tags attached and the color thereof. Because the source folder for expansion has tags attached to both sides thereof, the user can understand the hierarchy even more easily.

Fourth Embodiment

The method of representation in a fourth embodiment is similar to that of the first through third embodiments in that markers are attached to content icons but differs from the first through third embodiments in that frame patterns not different in color are attached as markers. The following description focuses on the difference from the first through third embodiments.

FIGS. 10A-10D schematically show a method of representing the hierarchy of contents according to the fourth embodiment. FIG. 10A shows a state prior to expanding the folder icon 121. FIG. 10B shows a state in which the folder icon 121 is expanded so that the items 123 are displayed. The effect processor 108 attaches first frame patterns 310 to the items 123 to indicate that they are targets of expansion in the first layer. As shown, the first frame patterns 310 are attached to the respective items. A difference from the first through third embodiments is that the color thereof is of minor importance. Another difference from the first through third embodiments is that the first frame pattern 310 is not attached to the folder icon 121, which indicates the source for expansion.

When the control 40 acquires an instruction to expand the item 123 marked "1", the effect processor 108 moves the item 123 marked "2" and subsequent items down and displays the items 125 in a space thus created, as shown in FIG. 10C. The effect processor 108 attaches second frame patterns 312 to the items 125 to indicate that they are items in the second layer displayed in an expanded view in the second step of expansion, such that the second frame patterns 312 are added outside of the first frame patterns 310.

When the control 40 acquires an instruction to expand the item 125 marked "1-1", the effect processor 108 moves the item 125 marked "1-2" and subsequent items down and displays the items 127 in a space thus created, as shown in FIG. 10D. The effect processor 108 attaches third frame patterns 314 to the item 125 marked "1-1" and the items 127 to indicate that they are items in the third layer displayed in an expanded view in the third step of expansion, such that the third frame patterns 314 are added outside of the second frame patterns 312. The first frame patterns 310, the second frame patterns 312 and the third frame patterns 314 are not colored differently depending on the layer or the number of steps of expansion.

According to the fourth embodiment, the user can easily understand the number of steps of expansion or the depth of layer by the number of frame patterns attached.

Fifth Embodiment

The method of representation in a fifth embodiment is similar to that of the first through fourth embodiments in that markers are attached to content icons but differs from the first through fourth embodiments in that line patterns are attached as markers. The following description focuses on the difference from the first through fourth embodiments, and the description of the common aspects is omitted.

FIGS. 11A-11D schematically show a method of representing the hierarchy of contents according to the fifth embodiment. FIG. 11A shows a state prior to expanding the folder icon 121. FIG. 11B shows a state in which the folder icon 121 is expanded so that the items 123 are displayed. The effect processor 108 attaches first line patterns 320 to the folder icon 121 and the items 123 to indicate that they are targets of expansion in the first layer. As shown, the first line patterns 320 are attached as lines connecting the folder icon 121 and the items 123, which are targets of concurrent expansion.

When the control 40 acquires an instruction to expand the item 123 marked "1", the effect processor 108 moves the item 123 marked "2" and subsequent items down and displays the items 125 in a space thus created, as shown in FIG. 11C. The effect processor 108 attaches second line patterns 322 to the item 123 marked "1" and the items 125 to indicate that they are items displayed in an expanded view in the second step of expansion, such that the second line patterns 322 are sandwiched between the first line patterns 320 and the items 123. As shown, the second line patterns 322 are attached as lines connecting the item 123 marked "1" and the items 125, which are targets of concurrent expansion.

When the control 40 acquires an instruction to expand the item 125 marked "1-1", the effect processor 108 moves the item 125 marked "1-2" and subsequent items down and displays the items 127 in a space thus created, as shown in FIG. 11D. The effect processor 108 attaches third line patterns 324 to the item 125 marked "1-1" and the items 127 to indicate that they are items displayed in an expanded view in the third step of expansion, such that the third line patterns 324 are sandwiched between the second line patterns 322 and the items 125. As shown, the third line patterns 324 are attached as lines connecting the item 125 marked "1-1" and the items 127, which are targets of concurrent expansion. The first line patterns 320, the first line patterns 320 and the third line patterns 324 are colored differently depending on number of steps of expansion.

According to the fifth embodiment, the user can easily understand the number of steps of expansion or the depth of layer by the number of line patterns attached and the color thereof.

Sixth Embodiment

The method of representation in a sixth embodiment is similar to that of the first through fifth embodiments in that markers are attached to content icons and is also similar to that of the fifth embodiment in that line patterns are attached as markers but differs from the fifth embodiment in the form of the line patterns. The following description focuses on the difference from the first through fifth embodiments, and the description of the common aspects is omitted.

FIGS. 12A-12D schematically show a method of representing the hierarchy of contents according to the sixth embodiment. FIG. 12A shows a state prior to expanding the folder icon 121. FIG. 12B shows a state in which the folder icon 121 is expanded so that the items 123 are displayed. The effect processor 108 attaches a first line pattern 320 to the folder icon 121 and the items 123 to indicate that they are targets of expansion in the first layer. The first line pattern 320 differs from that of the fifth embodiment in that it is attached to surround or encircle the multiple items which are targets of concurrent expansion. The first line pattern 320 surrounds the right side of the folder icon 121, which indicates the source for expansion, and surrounds the left side of the items 123 displayed in an expanded view. As a result, the source for expansion and the result of expansion are visually distinguished.

When the control 40 acquires an instruction to expand the item 123 marked "1", the effect processor 108 moves the item 123 marked "2" and subsequent items down and displays the items 125 in a space thus created, as shown in FIG. 12C. The effect processor 108 attaches the second line pattern 322 to the items 125 to indicate that they are items displayed in an expanded view in the second step of expansion, such that the second line pattern 322 is sandwiched between the first line pattern 320 and the items 123. The second line pattern 322 surrounds the right side of the item 123 marked "1", which represents the source folder for expansion, and surrounds the left side of the items 125 displayed in an expanded view.

When the control 40 acquires an instruction to expand the item 125 marked "1-1", the effect processor 108 moves the item 125 marked "1-2" and subsequent items down and displays the items 127 in a space thus created, as shown in FIG. 12D. The effect processor 108 attaches the third line pattern 324 to the item 125 marked "1-1" and the items 127 to indicate that they are items displayed in an expanded view in the third step of expansion, such that the third line pattern 324 is sandwiched between the second line pattern 322 and the items 125. The third line pattern 324 surrounds the right side of the item 125 marked "1-1", which represents the source folder for expansion, and surrounds the left side of the items 127 displayed in an expanded view. The first line pattern 320, the second line patterns 322 and the third line pattern 324 are colored differently depending on number of steps of expansion or the depth of layer.

According to the sixth embodiment, the user can easily understand the number of steps of expansion or the depth of layer by the difference in the number of line patterns attached and the color thereof. The mode of attaching line patterns is different between a folder and the items therein such as by attaching a line pattern to surround the right side of a source folder for expansion and surround the left side of the contents displayed in an expanded view. Accordingly, the user can understand the hierarchy even more easily.

Seventh Embodiment

A seventh embodiment differs from the foregoing embodiments in that a color is attached to specific content icons which are targets of expansion. The following description focuses on the difference from the first through sixth embodiments, and the description of the common aspects is omitted.

FIGS. 13A-13D schematically show a method of representing the hierarchy of contents according to the seventh embodiment. FIG. 13A shows a state prior to expanding the folder icon 121. FIG. 13B shows a state in which the folder icon 121 is expanded so that the items 123 are displayed. The effect processor 108 attaches a color to the folder icon 121 to indicate that it is the first source folder for expansion. In the illustrated example, the folder icon 121 is darkened.

When the control 40 acquires an instruction to expand the item 123 marked "1", the effect processor 108 moves the item 123 marked "2" and subsequent items down and displays the items 125 in a space thus created, as shown in FIG. 13C. The effect processor 108 attaches a color to the item 123 marked "1" to indicate that it is a source folder for expansion of the second layer. In the illustrated example, the item 123 marked "1" is more darkly colored than the folder icon 121 to indicate that the item 123 marked "1" is deeper in the hierarchy than the folder icon 121.

When the control 40 acquires an instruction to expand the item 125 marked "1-1", the effect processor 108 moves the item 125 marked "1-2" and subsequent items down and displays the items 127 in a space thus created, as shown in FIG. 13D. The effect processor 108 attaches a color to the item 125 marked "1-1" to indicate that it is a source folder for expansion of the third layer. In the illustrated example, the item 125 marked "1-1" is more darkly colored than the item 123 marked "1" to indicate that the item 125 marked "1-1" is deeper in the hierarchy than the item 123 marked "1".

According to the seventh embodiment, the user can easily understand the number of steps of expansion or the depth of layer by the position of item colored and the depth of the color.

Eighth Embodiment

An eighth embodiment differs from the foregoing embodiments in that the form of specific content icons selected from the targets of expansion is changed. The following description focuses on the difference from the first through seventh embodiments, and the description of the common aspects is omitted.

FIGS. 14A-14D schematically show a method of representing the hierarchy of contents according to the eighth embodiment. FIG. 14A shows a state prior to expanding the folder icon 121. FIG. 14B shows a state in which the folder icon 121 is expanded so that the items 123 are displayed. The effect processor 108 changes the form of the folder icon 121 to indicate that it is a source folder for expansion of the first layer. In the illustrated example, the form is changed such that the surface of folder icon 121 is curled up and a downward arrow is displayed underneath the curled surface. This will visually indicate that items located below the folder icon 121 are displayed by expanding it.

When the control 40 acquires an instruction to expand the item 123 marked "1", the effect processor 108 moves the item 123 marked "2" and subsequent items down and displays the items 125 in a space thus created, as shown in FIG. 14C. The effect processor 108 changes the form of the item 123 marked "1" to indicate that it is a source folder for expansion of the second layer. In the illustrated example, the form is changed such that the icon surface of item 123 marked "1" is curled up at an angle greater than the angle of curling of the folder icon 121, so as to indicate that the item 123 marked "1" is deeper in the hierarchy than the folder icon 121. The effect processor 108 also displays a downward arrow underneath the curled surface of the item 123 marked "1". This will visually indicate that items 125 located below the folder icon 121 are displayed by expanding it.

When the control 40 acquires an instruction to expand the item 125 marked "1-1", the effect processor 108 moves the item 125 marked "1-2" and subsequent items down and displays the items 127 in a space thus created, as shown in FIG. 14D. The effect processor 108 changes the form of the item 125 marked "1-1" to indicate that it is a source folder for expansion of the third layer. In the illustrated example, the form is changed such that the icon surface of item 125 marked "1-1" is curled up at an angle greater than the angle of curling of the folder icon 123 marked "1", so as to indicate that the item 125 marked "1-1" is deeper in the hierarchy than the item 123 marked "1". The effect processor 108 also displays a downward arrow underneath the curled surface of the item 125 marked "1-1". This will visually indicate that items 127 located below the item 125 marked "1-1" are displayed by expanding it.

According to the eighth embodiment, the user can easily understand the number of steps of expansion or the depth of layer by the position of item changed in form and the magnitude of the change.

Ninth Embodiment

The method of representation in a ninth embodiment is similar to that of the first through sixth embodiments in that markers are attached to content icons but differs from the first through sixth embodiments in that 3D patterns are attached as markers. The following description focuses on the difference from the foregoing embodiments, and the description of the common aspects is omitted.

FIGS. 15A-15D schematically show a method of representing the hierarchy of contents according to the ninth embodiment. FIG. 15A shows a state prior to expanding the folder icon 121. FIG. 15B shows a state in which the folder icon 121 is expanded so that the items 123 are displayed. The effect processor 108 attaches a marker to the folder icon 121 to indicate that it is a source folder for expansion of the first layer. In the illustrated example, the marker is attached such that a first 3D pattern 330 is placed on the surface of the folder icon 121. The first 3D pattern 330 is a transparent pattern of a form approximating a cube and is presented so that the user can see the surface of the folder icon 121 through the first 3D pattern 330. This will visually indicate that items located below the folder icon 121 are derived therefrom.

When the control 40 acquires an instruction to expand the item 123 marked "1", the effect processor 108 moves the item 123 marked "2" and subsequent items down and displays the items 125 in a space thus created, as shown in FIG. 15C. The effect processor 108 attaches a marker to the item 123 marked "1" to indicate that it is a source folder for expansion of the second layer. In the illustrated example, the marker is attached such that a second 3D pattern 332 is placed on the surface of the item 123 marked "1". The second 3D pattern 332 is a transparent, square pole pattern and is presented so that the user can see the surface of the item 123 through the second 3D pattern 332. The difference in layers and in the number of steps of expansion are represented by ensuring that the second 3D pattern 332 appears higher than the first 3D pattern 330.

When the control 40 acquires an instruction to expand the item 125 marked "1-1", the effect processor 108 moves the item 125 marked "1-2" and subsequent items down and displays the items 127 in a space thus created, as shown in FIG. 15D. The effect processor 108 attaches a marker to the item 125 marked "1-1" to indicate that it is a source folder for expansion of the third layer. In the illustrated example, the marker is attached such that a third 3D pattern 334 is placed on the surface of the item 125 marked "1-1". The third 3D pattern 334 is a transparent, square pole pattern and is presented so that the user can see the surface of the item 125 through the third 3D pattern 334. The difference in layers and in the number of steps of expansion are represented by ensuring that the third 3D pattern 334 appears higher than the second 3D pattern 332.

According to the ninth embodiment, the user can easily understand the number of steps of expansion or the depth of layer by the position of marked item and the size of the mark.

Tenth Embodiment

The method of representation in a tenth embodiment is similar to that of the first through sixth embodiments and the ninth embodiment in that markers are attached to content icons but differs from the first through sixth embodiments and the ninth embodiment in respect of the pattern of the markers. The following description focuses on the difference from the foregoing embodiments, and the description of the common aspects is omitted.

FIGS. 16A-16D schematically show a method of representing the hierarchy of contents according to a tenth embodiment. FIG. 16A shows a state prior to expanding the folder icon 121. FIG. 16B shows a state in which the folder icon 121 is expanded so that the items 123 are displayed. The effect processor 108 attaches a marker to the folder icon 121 to indicate that it is a source folder for expansion of the first layer. In the illustrated example, a first semicircular pattern 340 is attached to the left side of the folder icon 121. In the first semicircular pattern 340, an arrow having a length equal to the radius of the circle is drawn to lead from the center of the circle to the circumference thereof. When expanding the items 123 from the folder icon 121, the effect processor 108 rotates the arrow in the first semicircular pattern 340 in a direction indicated by the broken line in the figure in synchronization with the expansion. This will visually indicate that items 123 are expanded from the folder icon 121.

When the control 40 acquires an instruction to expand the item 123 marked "1", the effect processor 108 moves the item 123 marked "2" and subsequent items down and displays the items 125 in a space thus created, as shown in FIG. 16C. The effect processor 108 attaches a marker to the item 123 marked "1" to indicate that it is a source folder for expansion of the second layer. In the illustrated example, a second semicircular pattern 342 is attached to the left side of the item 123 marked "1". As in the first semicircular pattern 340, an arrow having a length equal to the radius of the circle is drawn in the second semicircular pattern 342. When expanding the items 125 from the item 123 marked "1", the effect processor 108 rotates the arrow in the second semicircular pattern 342 in a direction indicated by the broken line in the figure in synchronization with the expansion. This will visually indicate that items 125 are expanded from the item 123 marked "1". The second semicircular pattern 342 is more deeply colored than the first semicircular pattern 340, and the difference in color represents the difference in layers and in the number of steps of expansion.

When the control 40 acquires an instruction to expand the item 125 marked "1-1", the effect processor 108 moves the item 125 marked "1-2" and subsequent items down and displays the items 127 in a space thus created, as shown in FIG. 16D. The effect processor 108 attaches a marker to the item 125 marked "1-1" to indicate that it is a source folder for expansion of the third layer. In the illustrated example, a third semicircular pattern 344 is attached to the left side of the item 125 marked "1-1". As in the first semicircular pattern 340 and the second semicircular pattern 342, an arrow having a length equal to the radius of the circle is drawn in the third semicircular pattern 344. When expanding the items 127 from the item 125 marked "1-1", the effect processor 108 rotates the arrow in the third semicircular pattern 344 in a direction indicated by the broken line in the figure in synchronization with the expansion. This will visually indicate that items 127 are expanded from the item 125 marked "1-1". The third semicircular pattern 344 is more deeply colored than the second semicircular pattern 342, and the difference in color represents the difference in layers and in the number of steps of expansion.

According to the tenth embodiment, the user can easily understand the number of steps of expansion or the depth of layer by the position of marked item and the color of the mark.

Eleventh Embodiment

The method of representation in an eleventh embodiment is similar to that of the eighth embodiment in that the form of specific content icons selected from the targets of expansion is changed but differs from the eighth embodiment in the mode of the change. The following description focuses on the difference from the foregoing embodiments, and the description of the common aspects is omitted.

FIGS. 17A-17D schematically show a method of representing the hierarchy of contents according to the eleventh embodiment. FIG. 17A shows a state prior to expanding the folder icon 121. FIG. 17B shows a state in which the folder icon 121 is expanded so that the items 123 are displayed. The effect processor 108 changes the form of the folder icon 121 and the items 123 to indicate that they are targets of expansion in the first layer. In the illustrated example, the folder icon 121 is presented as a cube. The effect processor 108 rotates the cube leftward by about 20 degrees as shown and displays an expanded view of the items 123 below the folder icon 121. As the cube having the facade of the folder icon 121 is rotated by 20 degrees, the right side thereof is slightly visible. The effect processor 108 displays an expanded view of the items 123 below the folder icon 121 in the form of cubes rotated about 70 degrees leftward, similarly to the folder icon 121. The items 123 appear as cubes rotate leftward about 70 degrees, and the side thereof slightly visible on the left is assigned the same pattern as the facade of the cube of the folder icon 121. Thus, the difference in the number of steps of expansion and in the layer are visually represented by the consistent use of the pattern on the surface of the cube and by the difference in the angle of rotation of the folder icon 121 and the items 123.

When the control 40 acquires an instruction to expand the item 123 marked "1", the effect processor 108 moves the item 123 marked "2" and subsequent items down and displays the items 125 in a space thus created, as shown in FIG. 17C. The effect processor 108 changes the form of the item 123 marked "1" and the items 125 to indicate that they are targets of expansion in the second layer. In the illustrated example, the effect processor 108 rotates the cube of the item 123 marked "1" further leftward about 40 degrees, and displays an expanded view of the items 125 below the item 123 marked "1". The effect processor 108 initially displays the items 125 in the form of cubes rotated about 70 degrees, similarly to the item 123 marked "1". Then the effect processor 108 rotates the cubes leftward about 90 degrees, while also moving the cubes downward. Thus, the difference in the number of steps of expansion and in the layer are visually represented by the presentation of one rotation followed by another and by the difference in the angle of rotation of the item 123 marked "1" and the items 125.

When the control 40 acquires an instruction to expand the item 125 marked "1-1", the effect processor 108 moves the item 125 marked "1-2" and subsequent items down and displays the items 127 in a space thus created, as shown in FIG. 17D. The effect processor 108 changes the form of the item 125 marked "1-1" and the items 127 to indicate that they are targets of expansion in the third layer. In the illustrated example, the effect processor 108 rotates the cube of the item 125 marked "1-1" further leftward about 40 degrees, and displays an expanded view of the items 127 below the item 125 marked "1-1". The effect processor 108 initially displays the items 127 in the form of cubes rotated about 70 degrees, similarly to the items 125 marked "1-1". Then the effect processor 108 rotates the cubes leftward about 90 degrees, while also moving the cubes downward. Thus, the difference in the number of steps of expansion and in the layer are visually represented by the presentation of one rotation followed by another and by the difference in the angle of rotation of the item 125 marked "1-1" and the items 127.

According to the eleventh embodiment, the user can easily understand the number of steps of expansion or the depth of layer by the position of item changed in form, the presentation of one change after another and the magnitude of the change.

Figure 18A:
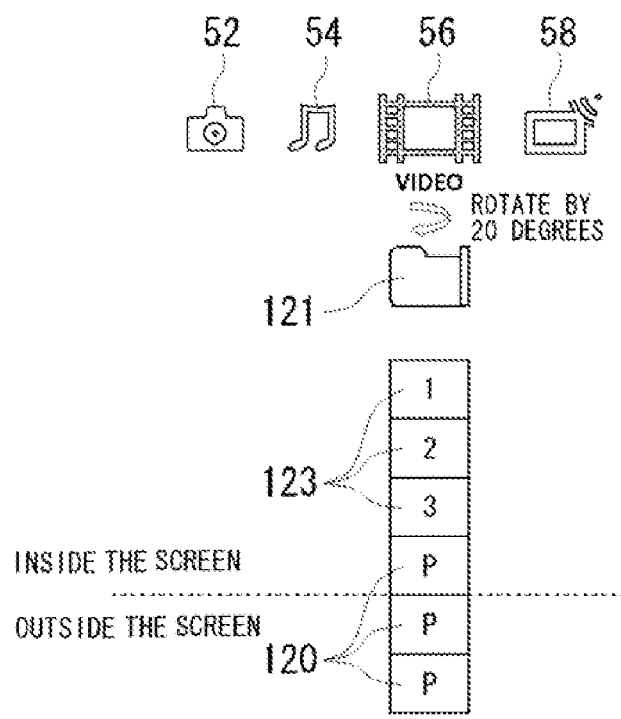
FIGS. 18A-18B schematically show another mode of representation according to the eleventh embodiment related to change of form of icons.
Figure 18B:
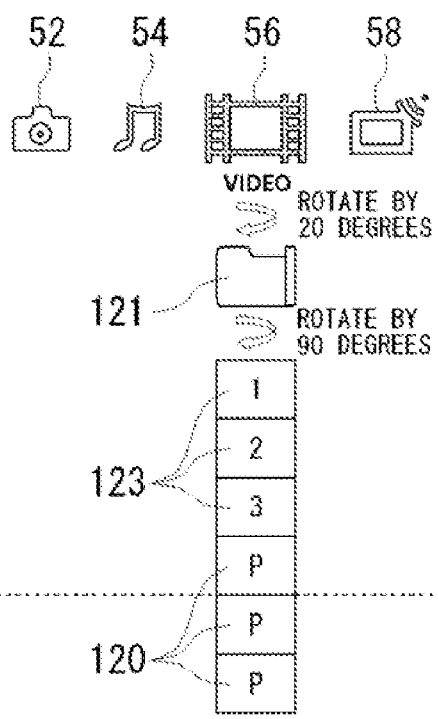

FIGS. 18A-18B schematically show another mode of representation according to the eleventh embodiment related to change of form of icons. In the example of FIG. 18A, the effect processor 108 rotates the folder icon 121, which is the source for expansion, as in the example of FIG. 17B. The difference is that only the folder icon 121 is rotated, and the items 123 are displayed in an expanded view below the folder icon 121 without being rotated. The above method is equally useful to represent the hierarchy by the action of expansion, and by the rotation or the absence thereof. In the example of FIG. 18B, the effect processor 108 displays an expanded view of the items 123 by rotating the cubes of the items 123 in synchronization with the folder icon 121, as in the example of FIG. 17B. The example of FIG. 18B is different from the example of FIG. 17B, where the same surface pattern as exhibited on the folder icon 121 is slightly visible on the left side of the items 123, because the rotation of the cubes of the items 123 is halted to present its surface facing the viewer. The above method is equally useful to represent the hierarchy by the action of rotation and expansion, and by the provision of a pattern or the absence thereof.

Twelfth Embodiment

The method of representation in a twelfth embodiment is similar to that of the foregoing embodiments in that the hierarchy is represented by the action of expanding icons but differs from the foregoing embodiments in that auditory as well as visual change is applied. The following description focuses on the difference from the foregoing embodiments, and the description of the common aspects is omitted.

FIGS. 19A-19D schematically shows a method of representing the hierarchy of contents according to a twelfth embodiment. FIG. 19A shows a state prior to expanding the folder icon 121. FIG. 19B shows a state in which the folder icon 121 is expanded so that the items 123 are displayed. The effect processor 108 displays an expanded view of the items 123 from the folder icon 121. When the control 40 acquires the user's instruction to move up or down, the effect processor 108 responds to the instruction to scroll the folder icon 121, the items 123 and the content icons 120 vertically. When one of the items 123 displayed in an expanded view is located in the area in focus 75 and selected, audio output that depends on the item selected is given out according to a musical scale. If the item 123 marked "1" is selected, a sound of a tone "do" is given out. When the item 123 marked "2" is selected, a sound of a tone "re" is given out. A single tone is output each time.

When the control 40 acquires an instruction to expand the item 123 marked "1", the effect processor 108 moves the item 123 marked "2" and subsequent items down and displays the items 125 in a space thus created, as shown in FIG. 19C. If any of the items 125 is selected as a result of an instruction for vertical scrolling acquired by the control 40, the effect processor 108 gives out a sound of a two-note chord comprising, for example, "do" and "mi". In this way, the difference from the items 123, the selection of which produces an output of only a single tone, in respect of the number of steps of expansion and in the layer is represented auditorily.

When the control 40 acquires an instruction to expand the item 125 marked "1-1", the effect processor 108 moves the item 125 marked "1-2" and subsequent items down and displays the items 127 in a space thus created, as shown in FIG. 19D. If any of the items 127 is selected as a result of an instruction for vertical scrolling acquired by the control 40, the effect processor 108 gives out a sound of a three-note chord comprising, for example, "do", "mi" and "so". In this way, the difference from the items 123, the selection of which produces an output of only a single tone, and from the items 125, the selection of which produces an output of two notes, in respect of the number of steps of expansion and in the layer is represented auditorily.

According to the twelfth embodiment, the user can intuitively understand the number of steps of expansion or the depth of layer by the difference in the number of notes in a chord or the difference in pitch between chord notes. The difference in the layer or in the number of steps of expansion may be represented by the difference in timbre instead of the difference in pitch. Any of the methods of the first through eleventh embodiments may be used as a method of visual representation.

Thirteenth Embodiment

The thirteenth embodiment differs from the first through twelfth embodiments in the method of vertically scrolling the array of content icons 72. The following description focuses on the difference from the first through twelfth embodiments, and the description of the common aspects is omitted.

Figure 20:
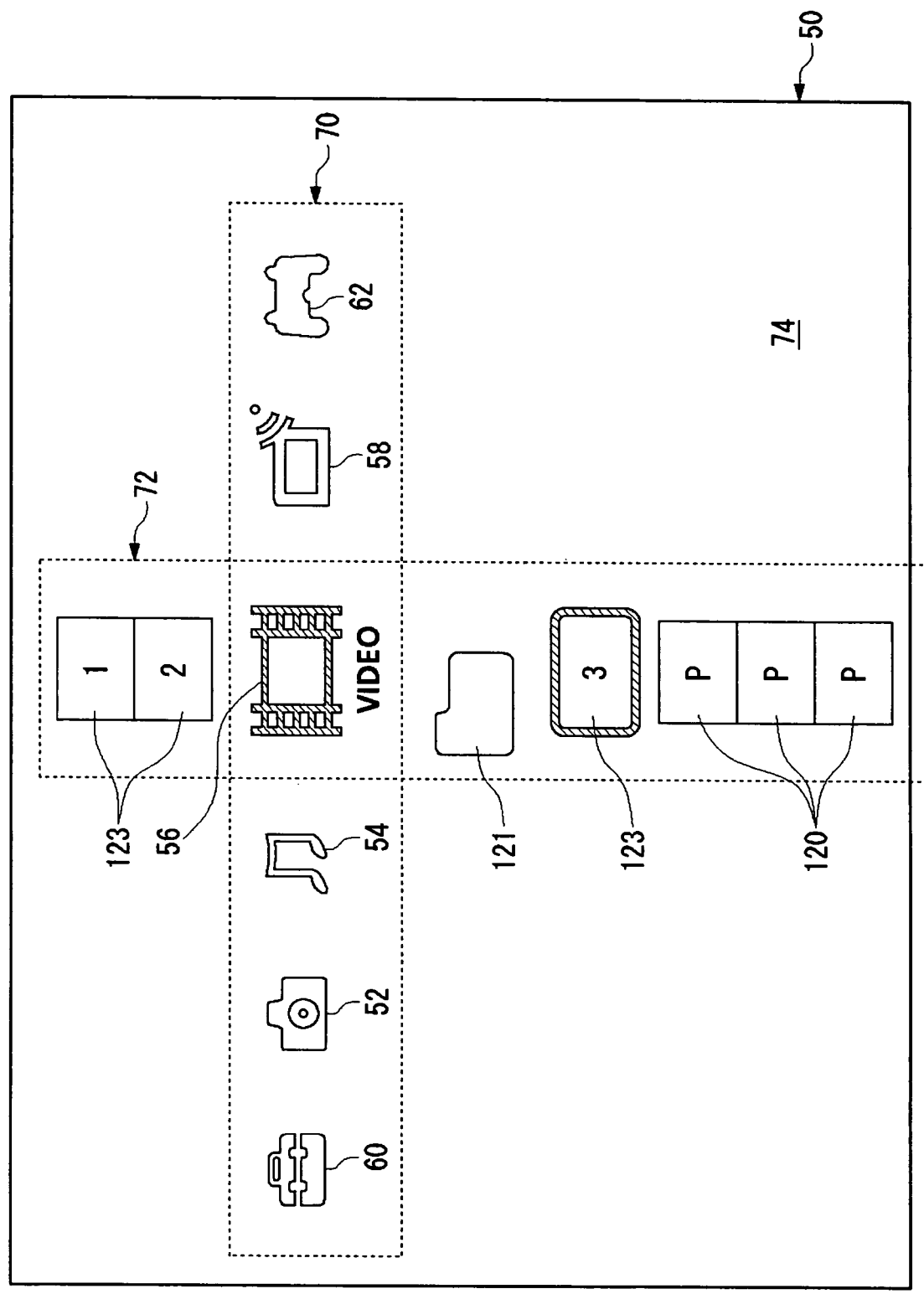
FIG. 20 schematically shows a method of vertical scrolling according to a thirteenth embodiment.

FIG. 20 schematically shows a method of vertical scrolling according to the thirteenth embodiment. In this embodiment, while the folder icon 121 is being expanded, the folder icon 121 is made to remain at the same position as the array of content icons 72 is scrolled vertically. Only the icons other than the folder icon 121 are scrolled. Referring to FIG. 20, when the control 40 receives an instruction to move up or down, the effect processor 108 scrolls the icons other than the folder icon 121, such as the items 123 displayed by expanding the folder icon 121 and the content icons 120. The effect processor 108 highlights the icon located immediately below the folder icon 121 as an icon for the content or folder which is a target of manipulation by the user, by, for example, enlarging it.

By maintaining the folder icon being expanded at the same position while the array of content icons 72 is scrolled, it is easy to visually identify which folder is being expanded. When a layer several levels deep in the hierarchy is being expanded, visual identification of the level of expansion may be facilitated by maintaining the deepest folder icon being expanded at the position immediately below the array of function icons 70. Alternatively, visual identification of whether a folder is being expanded at all may be facilitated by maintaining the least deepest folder icon being expanded at the position immediately below the array of function icons 70, even when a layer several levels deep in the hierarchy is being expanded.

The method of expanding the array of content icons 72 according to the first embodiment is illustrated in FIG. 20. Alternatively, the method of expanding according to any of the second through twelfth embodiments may be employed in this embodiment.

The effect processor 108 may vary speed of scrolling the array of content icons 72 depending on the depth of layer associated with the folder being expanded. For example, the speed of scrolling may be reduced as the folder layer is deepened and increased as the folder layer is less deep. The deeper the expanded folder, the larger the number of contents or folders contained. Therefore, the above approach enables the user to make a thorough search before identifying the desired content or folder. Conversely, the speed of scrolling may be increased as the folder layer is deepened and decreased as the folder layer is less deep. The deeper the expanded folder, the larger the number of contents or folders contained. Therefore, the above approach enables the user to take a quick look at the hierarchy and to identify the desired content or folder efficiently.

Described above is an explanation of the invention based on the embodiments. These embodiments are only illustrative in nature and it will be obvious to those skilled in the art that variations in constituting elements and processes are possible and that such variations are also within the scope of the present invention. Several of those variations will now be described.

In the described embodiments, it is assumed that moving image contents are stored both in the content player 20 and the external appliances. In one variation, contents other than moving images such as photos, music and games may be stored both in the content player 20 and the external appliances. In this case, items of contents such as photos, music and games stored in the external appliances are displayed in the on-screen menu 50, by using similar methods as used to display items of moving image contents in the embodiments.

In the described embodiments, the on-screen menu is configured such that the area of intersection 76 is located immediately above the area in focus 75. In one variation, the on-screen menu may be designed such that the area of intersection 76 is located immediately below the area in focus 75 or in the neighborhood thereof, as long as the user can easily view the function icons without turning his or her eyes from the icon in focus 64. In the described embodiments, the array of function icons 70 and the array of content icons 72 are displayed horizontally and vertically, respectively, in the on-screen menu 50. In one variation, the array of function icons 70 and the array of content icons 72 may be displayed diagonally.

In the described embodiments, the function icon and the content icon displayed in the area of intersection 76 and the area in focus 75, respectively, are highlighted. In one variation, icons other than the function icon and the content icon, which are displayed in the area of intersection 76 and the area in focus 75, respectively, are displayed with graded color change that occurs toward the edge of the on-screen menu 50, so that the icons at the center of the on-screen menu 50 are relatively highlighted. The graded color change may be a change in which brightness or chroma decreases toward the edge. Alternatively, the alpha value used for blending with the content image being played in the background area 74 may be lowered toward the edge.

In the described embodiments, the content player 20 is designed such that the area of intersection 76 and the area in focus 75 are located practically in the center of the on-screen menu 50. In one variation, the display position of the area of intersection 76 and the area in focus 75 may be user configurable. More specifically, while it is preferable that the area of intersection 76 and the area in focus 75 be displayed practically at the center of the on-screen menu 50, flexibility may be provided by allowing the position thereof to be configurable.

INDUSTRIAL USABILITY

The present invention is applicable to the interface of a content player.

The invention claimed is:

1. A content player capable of playing contents, comprising:
 a control which acquires an instruction for playing of contents via a user's manipulation;
 a storage which stores data for a plurality of function icons representing respective types of content playing functions, the contents to be played by the player, and data for a plurality of content icons representing items of the contents and represented as cubes;
 a display output module which outputs image data for an on-screen menu related to playing of the contents to a display device and which plays the contents acquired from the storage in response to the user's instruction acquired by the control;
 a display controller which generates the image data for the on-screen menu with a two-dimensional array which includes a first array comprising the plurality of function icons arranged in a specific direction on a screen along a first axis and which also includes a second array comprising the plurality of content icons in a direction intersecting the first array on the screen along a second axis, wherein
 the display controller displays the second array to intersect the first array at a position of one of the function icons selected by the user, and
 if the content icons to be displayed in the second array have a hierarchical structure where a content icon in a higher layer can be expanded along the second axis to a content icon in a lower layer, represents the hierarchy visually by displaying the content icons in an expanded view in the second array each time the control acquires an instruction to display an expanded view of a layer in the hierarchy, while also rotating two cubes respectively representing the content icons of an immediate source for expansion and newly displayed in an expanded view, about the second axis common to the both cubes by different angles which are determined by a number of steps of expansion and a depth of the layer.

2. The content player according to claim 1, wherein information indicating parent-child relation in the hierarchy is attached to at least one side of the cubes representing the content icons.

3. The content player according to claim 1, wherein at least one side of the cubes representing the content icons displayed in an expanded view has a similar pattern as at least one side of the cube representing the content icon which is a source for expansion, and
 the display controller represents parent-child relation in the hierarchy visually, by displaying the content icons in an expanded view and the content icon which is the source for expansion at an angle which allows the similar pattern to be visible, as a result of rotating.

4. A method of displaying an on-screen menu in a content player, comprising:
 reading data for a plurality of function icons representing respective types of content playing functions, and data for a plurality of content icons representing items of the contents and represented as cubes;
 generating image data for the on-screen menu with a two-dimensional array which includes a first array comprising the plurality of function icons arranged in a specific direction on a screen along a first axis and which also includes a second array comprising the plurality of content icons in a direction along a second axis intersecting the first array on the screen; and
 outputting the image data for the on-screen menu related to playing of the contents to a display device, wherein
 the generating displays the second array to intersect the first array at a position of one of the function icons selected by a user, and
 if the content icons to be displayed in the second array have a hierarchical structure where a content icon in a higher layer can be expanded to a content icon in a lower layer, represents the hierarchy visually by displaying the content icons in an expanded view in the second array each time an instruction is acquired from the user to display an expanded view of a layer in the hierarchy, while also rotating two cubes respectively representing the content icons of an immediate source for expansion and newly displayed in an expanded view, about the second axis common to the both cubes by different angles which are determined by a number of steps of expansion and a depth of the layer.

5. The method of displaying an on-screen menu according to claim 4, wherein information indicating parent-child relation in the hierarchy is attached to at least one side of the cubes representing the content icons.

6. The method of displaying an on-screen menu according to claim 4, wherein at least one side of the cubes representing the content icons displayed in an expanded view has a similar pattern as at least one side of the cube representing the content icon which is a source for expansion, and the generating represents parent-child relation in the hierarchy visually, by displaying the content icons in an expanded view and the content icon which is the source for expansion at an angle which allows the similar pattern to be visible, as a result of rotating.

7. A non-transitory computer readable medium having stored therein a computer program executable by a computer for displaying an on-screen menu in a content player, comprising:

an acquiring module which acquires an instruction related to playing of contents via a user's manipulation;

a storing module which stores data for a plurality of function icons representing respective types of content playing functions, the contents to be played by the player, and data for a plurality of content icons representing respective items of contents and represented as cubes;

a playing module which outputs image data for an on-screen menu related to playing of the contents to a display device and which plays the contents acquired from the player in response to the user's instruction; and a generating module which generates image data for the on-screen menu with a two-dimensional array which includes a first array comprising the plurality of function icons arranged in a specific direction along a first axis on a screen and which also includes a second array comprising the plurality of content icons arranged along a second axis in a direction intersecting the first array on the screen, wherein the generating module displays the second array to intersect the first array at a position of one of the function icons selected by the user, and if the content icons to be displayed in the second array have a hierarchical structure where a content icon in a higher layer can be expanded to a content icon in a lower layer, represents the hierarchy visually by displaying the content icons in an expanded view about the second axis in the second array each time an instruction is acquired from the user to display an expanded view of a layer in the hierarchy, while also rotating two cubes respectively representing the content icons of an immediate source for expansion and newly displayed in an expanded view, about the second axis common to the both cubes by different angles which are determined by a number of steps of expansion and a depth of the layer.

8. The computer readable medium according to claim 7, wherein information indicating parent-child relation in the hierarchy is attached to at least one side of the cubes representing the content icons.

9. The computer readable medium according to claim 7, wherein at least one side of the cubes representing the content icons displayed in an expanded view has a similar pattern as at least one side of the cube representing the content icon which is a source for expansion, and the generating module represents parent-child relation in the hierarchy visually, by displaying the content icons in an expanded view and the content icon which is the source for expansion at an angle which allows the similar pattern to be visible, as a result of rotating.

10. A content player capable of playing contents, comprising:

a control which acquires an instruction for playing of contents via a user's manipulation;

a storage which stores data for a plurality of function icons representing respective types of content playing functions, the contents to be played by the player, and data for a plurality of content icons representing respective items of contents;

a display output module which outputs image data for an on-screen menu related to playing of the contents to a display device and which plays the contents acquired from the storage in response to the user's instruction acquired by the control;

a display controller which generates the image data for the on-screen menu with a two-dimensional array which includes a first array comprising the plurality of function icons arranged in a specific direction along a first axis on a screen and which also includes a second array comprising the plurality of content icons arranged along a second axis in a direction intersecting the first array on the screen, wherein the display controller displays the second array to intersect the first array at a position of one of the function icons selected by the user, and if the content icons to be displayed in the second array have a hierarchical structure where a content icon in a higher layer can be expanded to a content icon in a lower layer, represents the hierarchy each time the control acquires an instruction to display an expanded view of a layer in the hierarchy, such that a first 3D pattern is placed on the surface of the content icons representing an immediate source for expansion and a second 3D pattern is placed on the surface of the content icons newly displayed in an expanded view, the first 3D pattern differing in height from the second 3D pattern.

* * * * *